US011879289B2

(12) United States Patent
Wojohn et al.

(10) Patent No.: US 11,879,289 B2
(45) Date of Patent: *Jan. 23, 2024

(54) SECURED VALET VAULT

(71) Applicant: The Valet Vault, LLC, Atlanta, GA (US)

(72) Inventors: Zachary Robertson Wojohn, Atlanta, GA (US); Richard Grant Henry, Atlanta, GA (US)

(73) Assignee: The Valet Vault, LLC, Atlanta, GA (US)

( * ) Notice: Subject to any disclaimer, the term of this patent is extended or adjusted under 35 U.S.C. 154(b) by 299 days.

This patent is subject to a terminal disclaimer.

(21) Appl. No.: 17/244,014

(22) Filed: Apr. 29, 2021

(65) Prior Publication Data

US 2021/0324673 A1 Oct. 21, 2021

Related U.S. Application Data

(63) Continuation of application No. 17/004,360, filed on Aug. 27, 2020, now Pat. No. 10,995,541.

(Continued)

(51) Int. Cl.

*E05G 1/08* (2006.01)
*E05G 1/026* (2006.01)
*E05G 1/00* (2006.01)

(52) U.S. Cl.

CPC ............... *E05G 1/08* (2013.01); *E05G 1/005* (2013.01); *E05G 1/026* (2013.01); *E05G 2700/02* (2013.01)

(58) Field of Classification Search

CPC .. E05G 1/00; E05G 1/005; E05G 1/02; E05G 1/026; E05G 1/04; E05G 1/06; E05G 1/08

See application file for complete search history.

(56) References Cited

U.S. PATENT DOCUMENTS 342,003 A * 5/1886 Gross ........................ E05G 1/00 109/74
874,933 A 12/1907 Bristow, Jr.

(Continued)

FOREIGN PATENT DOCUMENTS

WO 2018005797 A1 1/2018

OTHER PUBLICATIONS

Avamplivox Portable Sound Systems, "Portable Valet Podium, Enhance Your Valet Services with this Rugged, Functional Portable Podium", Mar. 1, 2020, 2 pages.

(Continued)

*Primary Examiner* — Christopher J Boswell

(74) *Attorney, Agent, or Firm* — BakerHostetler

(57) ABSTRACT

A valet vault is described herein. The valet vault may be constructed with components that result in improved strength and prevent theft. In one example embodiment, the vault may comprise a service side, an attachment side, and four exterior sides, a lockable utility box, a secured storage area being accessible through a door where a hinged end of the door is pivotally connected to a door frame by at least one hinge, and a security plate substantially separating the secured storage area and the lockable utility box. The vault may comprise a catch/latch to stop the door. The vault may comprise an illuminatable sign that does not compromise the security of the secured storage area. The door may comprise reinforcements. The vault may be a podium or be coupled to a wall.

20 Claims, 23 Drawing Sheets

Related U.S. Application Data

(60) Provisional application No. 62/985,711, filed on Mar. 5, 2020.

(56) References Cited

U.S. PATENT DOCUMENTS

| | | | | |
|---|---|---|---|---|
| 1,416,566 | A | 5/1922 | Mccleary | |
| 1,749,203 | A | 3/1930 | Wolters | |
| 1,966,272 | A | 7/1934 | Vance | |
| 2,076,085 | A | 4/1937 | Hunnicutt | |
| 2,299,347 | A | 10/1942 | Rifkin | |
| 2,448,945 | A | 9/1948 | Zacharias | |
| 2,887,966 | A | 5/1959 | Felton | |
| 3,715,998 | A * | 2/1973 | Teleky | E05G 1/00 109/58 |
| 3,837,299 | A | 9/1974 | McClellan | |
| 3,861,766 | A | 1/1975 | Corsini et al. | |
| 4,058,356 | A | 11/1977 | Michal | |
| 4,548,330 | A * | 10/1985 | Hewitt | H02B 1/066 109/70 |
| 4,557,416 | A | 12/1985 | Stahl et al. | |
| 4,835,997 | A | 6/1989 | Akright | |
| 4,926,762 | A | 5/1990 | Paul | |
| 5,035,187 | A | 7/1991 | McGunn | |
| 5,118,175 | A | 6/1992 | Costello | |
| 5,286,103 | A | 2/1994 | Price, Jr. et al. | |
| 5,427,036 | A | 6/1995 | Fee et al. | |
| 5,435,255 | A | 7/1995 | Elseser et al. | |
| 5,607,102 | A | 3/1997 | Walsh et al. | |
| 5,664,853 | A | 9/1997 | Nickolaus, Jr. | |
| 5,701,828 | A | 12/1997 | Benore et al. | |
| 5,732,878 | A | 3/1998 | Schroder et al. | |
| 5,890,439 | A | 4/1999 | McGunn | |
| 6,871,601 | B2 | 3/2005 | Stinson | |
| 7,387,076 | B2 | 6/2008 | Bauman et al. | |
| 7,516,832 | B2 | 4/2009 | Dobbins | |
| 8,276,527 | B2 | 10/2012 | Stepp | |
| 8,456,819 | B1 * | 6/2013 | Smith | G06F 1/1632 361/679.02 |
| 9,192,233 | B2 * | 11/2015 | Smith | A47B 96/04 |
| 10,774,578 | B2 * | 9/2020 | Raz | E06B 5/113 |
| 10,995,541 | B1 * | 5/2021 | Wojohn | E05G 1/026 |
| 2004/0177794 | A1 * | 9/2004 | DuBois | G07F 9/10 109/24.1 |
| 2004/0239126 | A1 | 12/2004 | Pratt et al. | |
| 2011/0174199 | A1 | 7/2011 | Pendleton et al. | |
| 2013/0113350 | A1 | 5/2013 | Lee | |
| 2014/0182489 | A1 | 7/2014 | Suggs et al. | |
| 2014/0261110 | A1 | 9/2014 | Romero et al. | |
| 2015/0089633 | A1 | 3/2015 | Eckerdt et al. | |
| 2017/0234057 | A1 | 8/2017 | Yardley et al. | |
| 2018/0004840 | A1 | 1/2018 | Herbelin | |
| 2020/0347640 | A1 * | 11/2020 | Dunstan | E05G 1/026 |

OTHER PUBLICATIONS

Security Station https:/www.thesecuritystation.com/small-security-boxf, Jan. 13, 2019, 4 pages.

The Valet Spot, "Compact Valet Podium, Economical, Modern Appearance, Light Weight", The Valet Spot Brochure, Jan. 2019, 2 pages.

The Valet Spot, "Custom Deluxe Podium, Upscale Look, Enhanced Security, Electronics Ready", The Valet Spot Brochure, Jan. 2019, 3 pages.

The Valet Spot, "Deluxe Valet Podium, Upscal Look, Enhanced Security, Electronics Ready", The Valet Spot Brochure, Jan. 2019, 2 pages.

The Valet Spot, "Portable Valet Podium, Portable, Full Size, Fast Shipping", The Valet Spot Brochure, Jan. 2019, 2 Pages.

The Valet Spot, "Stainless Steel Podium, Elegant Look, Brushed Stainless Steel Construction", The Valet Spot Brochure, Jan. 2019, 2 pages.

The Valet Spot, "Standard Valet Podium, Economical, Intelligent Design, Fast Shipping", The Valet Spot Brochure, Jan. 2019, 2 pages.

The Valet Spot, "Catalog", Jan. 2019, 43 pages.

"Visual Podiums: Converting Regular Valet Podiums into a Digital Experience", https://www.prdistribution.com/news/visual-podiums-converting-regular-valet-podiums-into-a-digital-experience/1425722, Jan. 16, 2017.

* cited by examiner

SECURED VALET VAULT

CROSS-REFERENCE TO RELATED APPLICATIONS

This application is a continuation of U.S. patent application Ser. No. 17/004,360 filed Aug. 27, 2020, now U.S. Pat. No. 10,995,541, which claims the benefit of U.S. Provisional Patent Application No. 62/985,711, filed Mar. 5, 2020, which are hereby incorporated by reference in their entirety as if fully set forth herein.

TECHNICAL FIELD

The present invention is in the field of secured storage for controlling access to valuables.

BACKGROUND

Valet personnel are charged with keeping car keys secure. Often, valet equipment, whether stand-alone or contained within a podium or kiosk, are broken into in order to steal car keys, tip money for the valet personnel, or other valuables. Once a thief has access to a car, the car owner's navigation system may be used by the thief to be directed to the home of the owner of the car where the thief may further steal goods from or vandalize the car owner's home. Accordingly, there is a need for improved valet equipment that more securely controls access to valuables contained therein.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

A valet vault is described herein. The valet vault may be constructed with components that result in improved strength and prevent theft. In an example embodiment, the vault may comprise a service side, an attachment side, four exterior sides, a lockable utility box, a secured storage area being accessible through a door where a hinged end of the door is pivotally connected to a door frame by at least one hinge, and a security plate substantially separating the secured storage area and the lockable utility box. The vault may be configured to be securely attached to a wall or a wall-like surface. The vault may comprise a key drop. The vault may comprise a catch/latch to stop the door. The vault may comprise an illuminatable sign that does not compromise the security of the secured storage area. The vault according to another embodiment comprises a service side, an attachment side, four exterior sides, and a secured storage area being accessible through a door where a hinged end of the door is pivotally connected to a door frame by at least one hinge. The door may comprise reinforcements.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

In the valet industry, key security is an important characteristic. Having a more secure vault to house keys and other valuables reduces the potential liability for stolen goods. Alternatively or additionally, a vault having an illuminatable sign that does not compromise the security of the vault can reduce liability by providing an illuminated area, easing the burden of locating the valet location for workers, pedestrians, and/or drivers.

Figure 1:
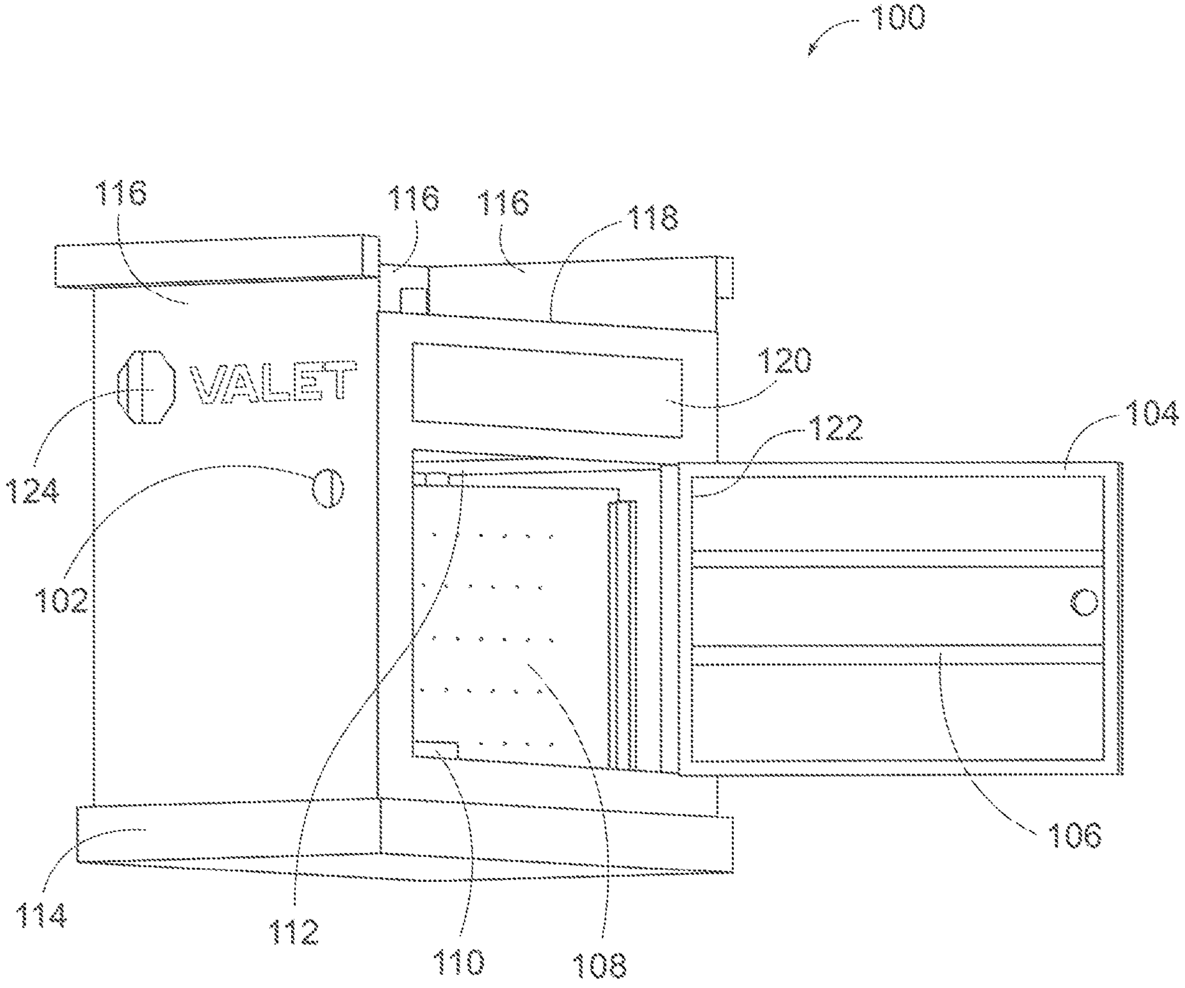
FIG. 1 shows a diagram of a valet podium, according to an aspect of this disclosure.

FIG. 1 shows a valet vault as a podium 100. The podium 100 may comprise a base 114, a service side, three exterior sides 116, a desktop 118, a lockable utility drawer 120, a secured storage area 108 being accessible through a door 104 where a hinged end 122 of the door 104 is pivotally connected to a door frame by at least one hinge, and a security plate 112 substantially separating the secured storage area 108 and the lockable utility drawer 120. The podium 100 may comprise a key drop 102. The podium 100 may comprise a catch/latch 110 to stop the door 104. The podium 100 may comprise at least one illuminatable sign 124 that does not compromise the security of the secured storage area 108, for example, the at least one illuminatable sign 124 being integrated into at least one exterior side 116. The podium 100 according to another embodiment comprises a base 114, a service side, three exterior sides 116, a desktop 118, and a secured storage area 108 being accessible through a door 104 where a hinged end 122 of the door 104 is pivotally connected to a door frame by at least one hinge. The door 104 may comprise reinforcements 106.

In an embodiment, the base 114 is spaced from the desktop 118 in a lateral direction. It should be appreciated that the desktop 118 may or may not be parallel to the base 114, for example, the desktop 118 may be tilted by about 5 or 10 or 15 degrees towards the service side for the convenience of the valet staff. The service side is spaced from a second exterior side 116 in the transverse direction, wherein the transverse direction is substantially perpendicular to the lateral direction. A first exterior side 116 is spaced from a third exterior side 116 in the longitudinal direction, wherein the longitudinal direction L is substantially perpendicular to both the lateral direction and the transverse direction.

The at least one sign 124 may be integrated into, onto, or defined by any of the three exterior sides 116, wherein the sign may or may not be internally illuminated. Additionally or alternatively, the sign 124 may be made of reflective material. The at least one sign 124 on at least one of the three exterior sides 116 may be configured so as to not substantially compromise the security of the secured storage area 108. A podium 100 with at least one illuminatable sign 124 may comprise wiring going through or around the security plate 112 connecting the at least one sign 124 to a power supply via wires, for example, a power supply contained in the secured storage area 108 wherein the wiring does not substantially compromise the security of the secured storage area 108. Additionally or alternatively, the at least one sign 124 may be battery powered. The podium 100 comprising the at least one illuminatable sign 124 may help drivers or customers in the valet context, for example, by enhancing the driver's and/or customer's ability to identify the location of the valet podium 100, and may further provide an illuminated area for valet workers and employees that may reduce the frequency of work-place accidents. The at least one sign 124 may be located in a lateral position on at least one of the exterior sides 116 between the secured storage area 108 and the desktop 118, although it should be appreciated that the at least one sign 124 may be located in any lateral location on at least one of the three exterior sides 116 so long as the location of the sign 124 does not substantially compromise the security of the secured storage area 108. In an embodiment, the at least one sign 124 is at about the same lateral position as the lockable utility drawer 120.

The security plate 112 may be laterally spaced between the at least one illuminated sign 124 and the secured storage area 108, wherein the security plate 112 is spaced from the base 114 by the secured storage area 108 in the lateral direction, and is substantially parallel to the base 114.

The lockable utility drawer 120 may be slidably disposed in the podium 100 such that the drawer 120 is movable between an open and closed position. The lockable utility drawer 120 also may be completely removed to gain internal access to the at least one illuminatable sign 124, wherein the removal of the lockable utility drawer 120 does not substantially compromising the security of the secured storage area 108. This solves the problem of people removing a drawer 120 to gain access to car keys or other valuables valet personal would store in the secured storage area 108.

The podium 100 may be made from aluminum, steel, stainless steel, any other material one skilled in the art would use to construct such a podium 100, or any combination thereof. The podium 100 may include an inscribed serial number to enable tracking of the podium in the event that the entire podium 100 is stolen. The podium 100 may include a device or circuitry capable of communicating via radio frequency to enable tracking of the podium in the event that the entire podium 100 is stolen.

The podium 100 may comprise an at least one catch 110, wherein a portion of a first surface of the at least one catch 110 is coupled to an interior surface of the door frame of the secured storage area 108, with substantially all of a remaining portion of the first surface of the at least one catch 110 being configured to catch the door 104 and prevent the door 104 from pivoting into the secured storage area 108. The at least one catch 110 further prevents unauthorized persons from kicking the door into the secured storage area to gain access to the valuables contained therein. The at least one catch 110 further prevents torqueing or twisting of the door should a leveraging device be used to attempt to pry the door 104 to an open position when the door 104 is secured in a closed position.

The door 104 of the secured storage area 108 may comprise a main body, four frame abutment bodies, and four door support bodies. Combined, the main body, the four frame abutment bodies, and the four door support bodies may form a strengthened section of the door 104. The strengthened section may further comprise an adjoining member. The main body has an interior surface, and an exterior surface opposite the interior surface; the four frame abutment bodies each have an interior surface, and an exterior surface opposite the interior surface; and the four door support bodies each have an interior surface, and an exterior surface opposite the interior surface. Each frame abutment body is orthogonally attached to the main body such that an elongated edge of each door frame abutment body is attached to a different edge of the main body and extending inward toward the secured storage area 108 when the door 104 is in the closed position. The door support bodies are orthogonally attached to a corresponding edge of a door frame abutment body of the four frame abutment bodies such that an elongated edge of each door support body is orthogonally connected to a corresponding edge of a corresponding door frame abutment body and extending toward a center of the main body of the door 104, with the door support bodies being substantially parallel to the main body. This is just one example embodiment, and the door may contain more or less door support bodies or door frame abutment bodies depending on the needs of the user. It should be appreciated that the door 104 can be shaped from a single piece of material by break-forming or other similar manufacturing methods known in the art. It should further be appreciated that the embodiment just described assumes a door 104 of a rectangular shape, however, the door 104 may be of any shape with a corresponding door frame shape, and the number of frame abutment bodies and door support bodies corresponding to the number of edges that the main body of the door 104 has.

Additionally, at least one door support body might be attached to at least one of its orthogonally adjacent support bodies by an adjoining member, thereby increasing the strength of the door.

Figure 2A:
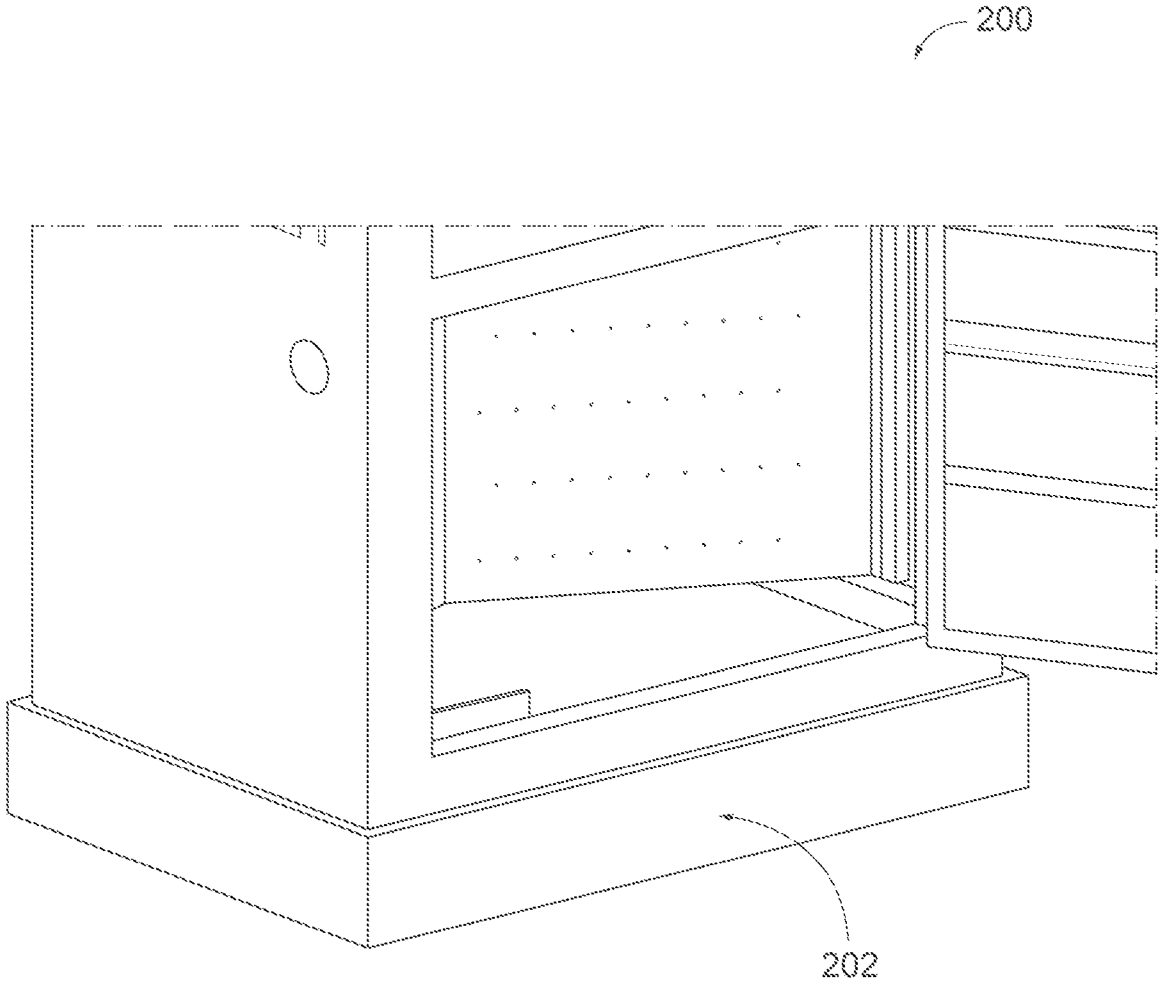
FIG. 2A shows a diagram of a base of a valet podium, according to an aspect of this disclosure.
Figure 2B:
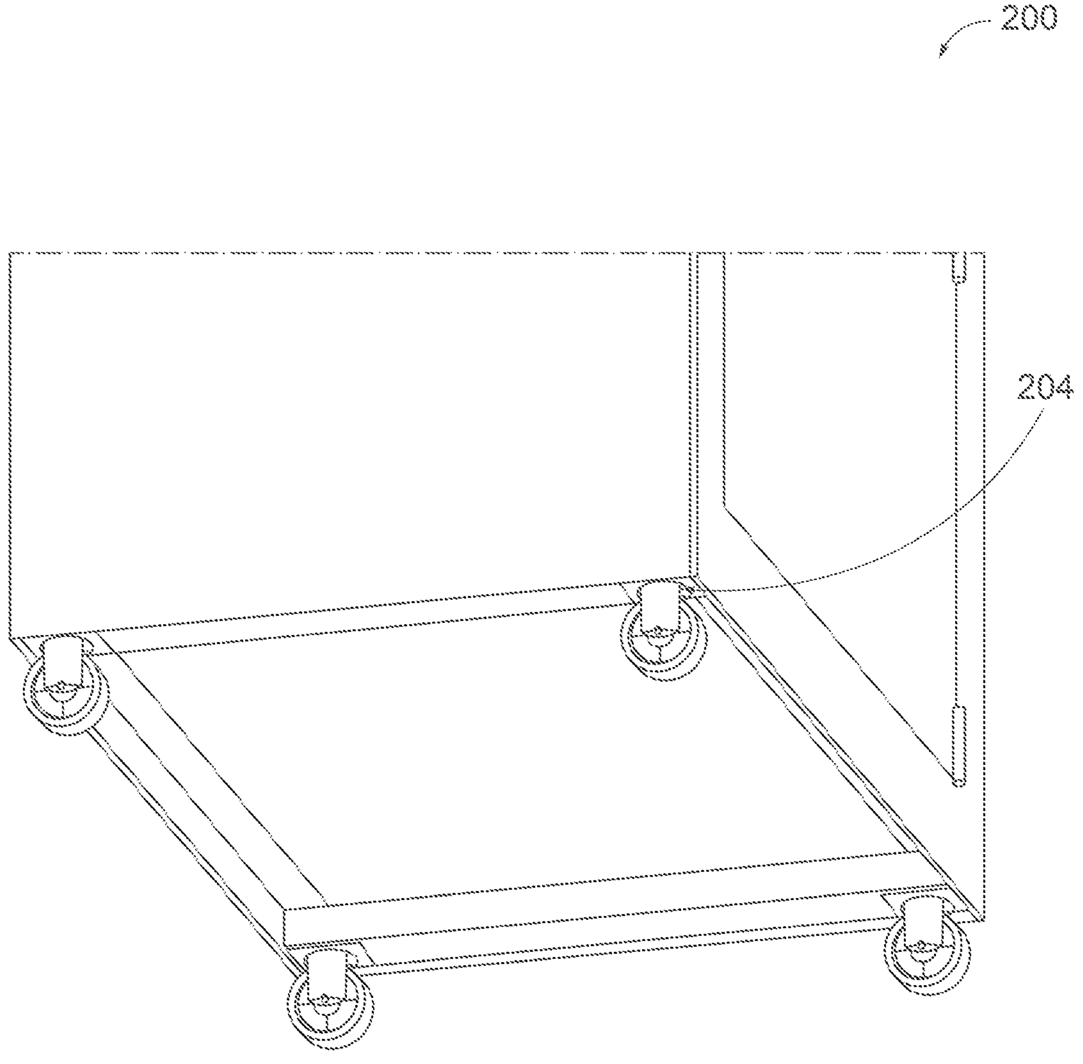
FIG. 2B shows another diagram of a base of a valet podium, according to an aspect of this disclosure.

FIGS. 2A-2B show a base of the podium having an attached skirt mount 202 or castors 204, respectively. FIG.

2A shows the podium 200 configured with a permanent skirt mount 202. A podium 200 with a skirt mount 202 is configured to be permanently mounted to the ground on which the podium 200 sits, for example, the sidewalk in front a restaurant. A podium 200 with a skirt mount 202 would be preferential for users that do not wish to move their podiums 200 as often as the users of podiums with castors 204 as illustrated in FIG. 2B, for example.

FIG. 2B shows a roll-around version of the podium 200 with one or more casters 204. For example, the podium 200 may comprise four castors 204 that are attached to the base of the podium 200. The castors 204 may be mechanically fastened to the base of the podium 200 by a plurality of bolts, wherein the base is configured to securely receive the bolts. The castors 204 may alternatively or additionally be fastened in any manner sufficient to attach the castors 204 to the base of the podium 200, such as by welding or using an adhesive.

Figure 3A:
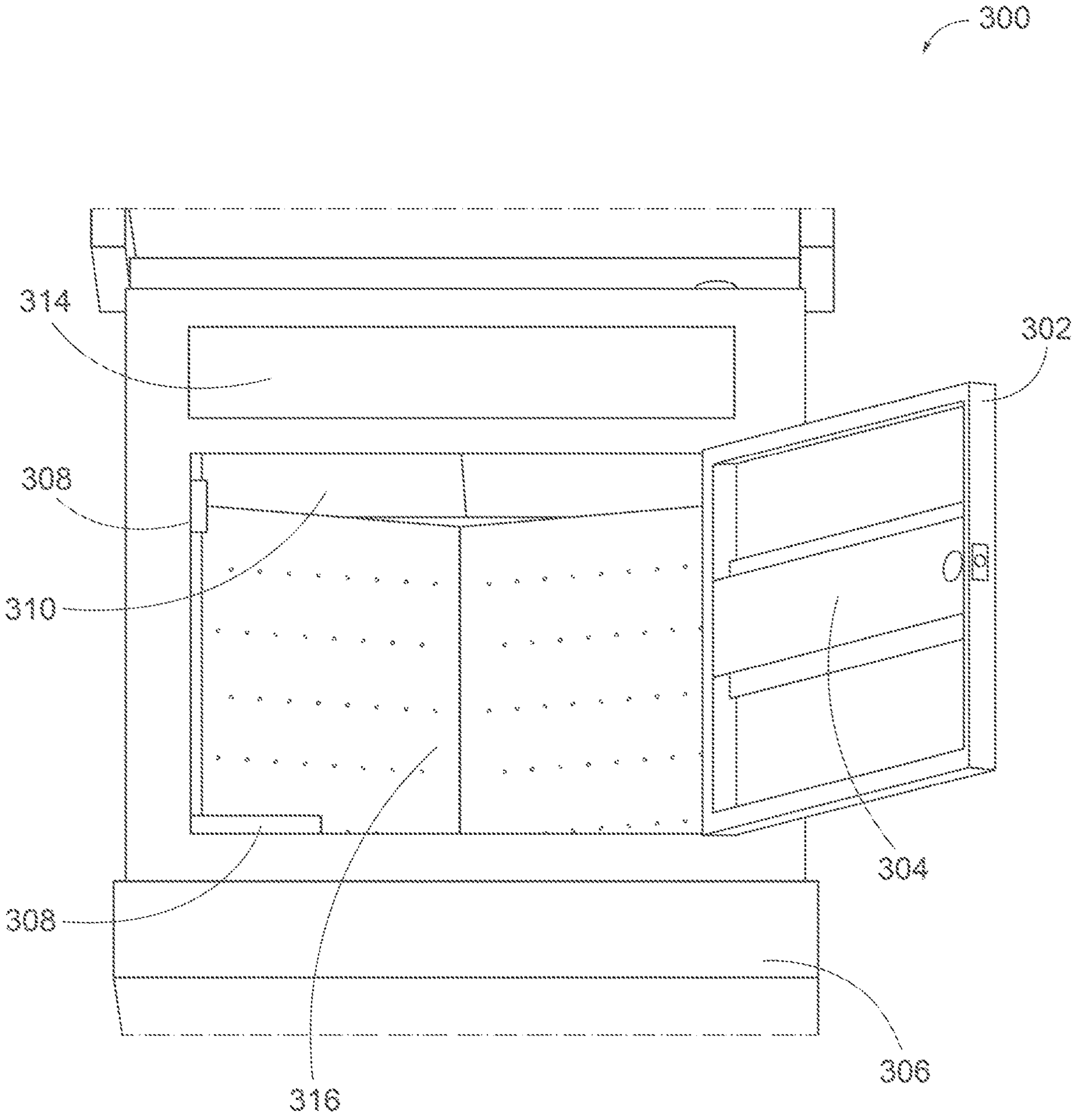
FIG. 3A shows a diagram of a valet podium, according to an aspect of this disclosure.

FIG. 3A shows a podium 300. The podium 300 may comprise a base 306, a lockable utility drawer 314, a secured storage area 316 being accessible through a door 302 where a hinged end of the door 302 is pivotally connected to a door frame by at least one hinge, and a security plate 310 substantially separating the secured storage area 316 and the lockable utility drawer 314. The podium may comprise a catch/latch 308 to stop the door 302 from pivoting into the secured storage area 316. The door 302 may comprise additional material to act as a reinforcement section 304 to increase the force required to leverage the door 302 to the open position when the door 302 is secured in the closed position. There may be more than one reinforcement section 304, where each reinforcement 304 has a central axis, and the central axis extends in a lateral, longitudinal, diagonal direction, or any desired direction along the interior surface of the main body of the door 302 for the secured storage area 316. It should be appreciated that if there is more than one reinforcement section 304, the central axis of each reinforcement section 304 may extend in the same or different direction as the others.

Figure 3B:
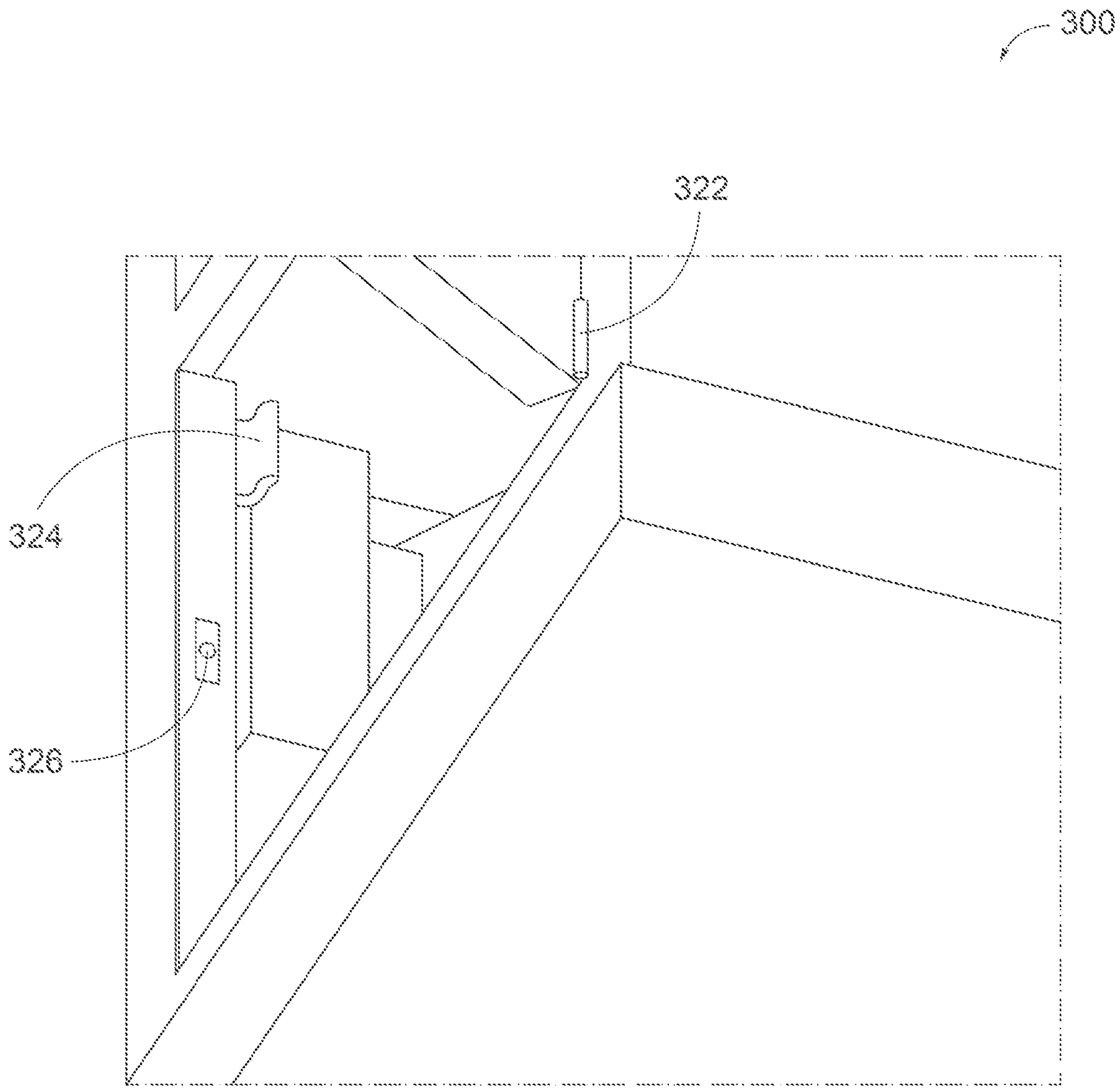
FIG. 3B shows a diagram of hinges, catches/latches used in a valet podium, according to an aspect of this disclosure.

FIG. 3B shows a diagram of hinges 322 used in a valet podium 300. The door to the secured storage area may be pivotally connected to the door frame of the secured storage area by at least one hinge 322. The at least one hinge 322 may be spring loaded so that when the door is left in the open position, the spring hinge 322 will bias the door towards a closed position. This reduces the problem of doors being accidentally left open. If there is more than one hinge 322, it should be appreciated that not all the hinges 322 must be spring loaded if at least one of the hinges 322 are spring loaded. For example, in an embodiment with two hinges 322, one hinge 322 can be spring loaded, while the other hinge 322 is not spring loaded; or in an embodiment with three hinges 322, one hinge 322 can be spring loaded with the other two hinges 322 not being spring loaded. This helps prevent the door of the secured storage area from being left open so that persons not authorized to access the secured storage area are not easily able to gain access to the secured storage area and the valuables contained therein. In an embodiment, the door has a frame with a catch/latch 324 verses a plate to stop the door, and has a ⅛-inch aluminum threshold. The podium 300 may comprise a strike plate and frame 326 to receive the lock through, which provides improved strength and compensates for any structural weakness in the locking mechanism.

Figure 3C:
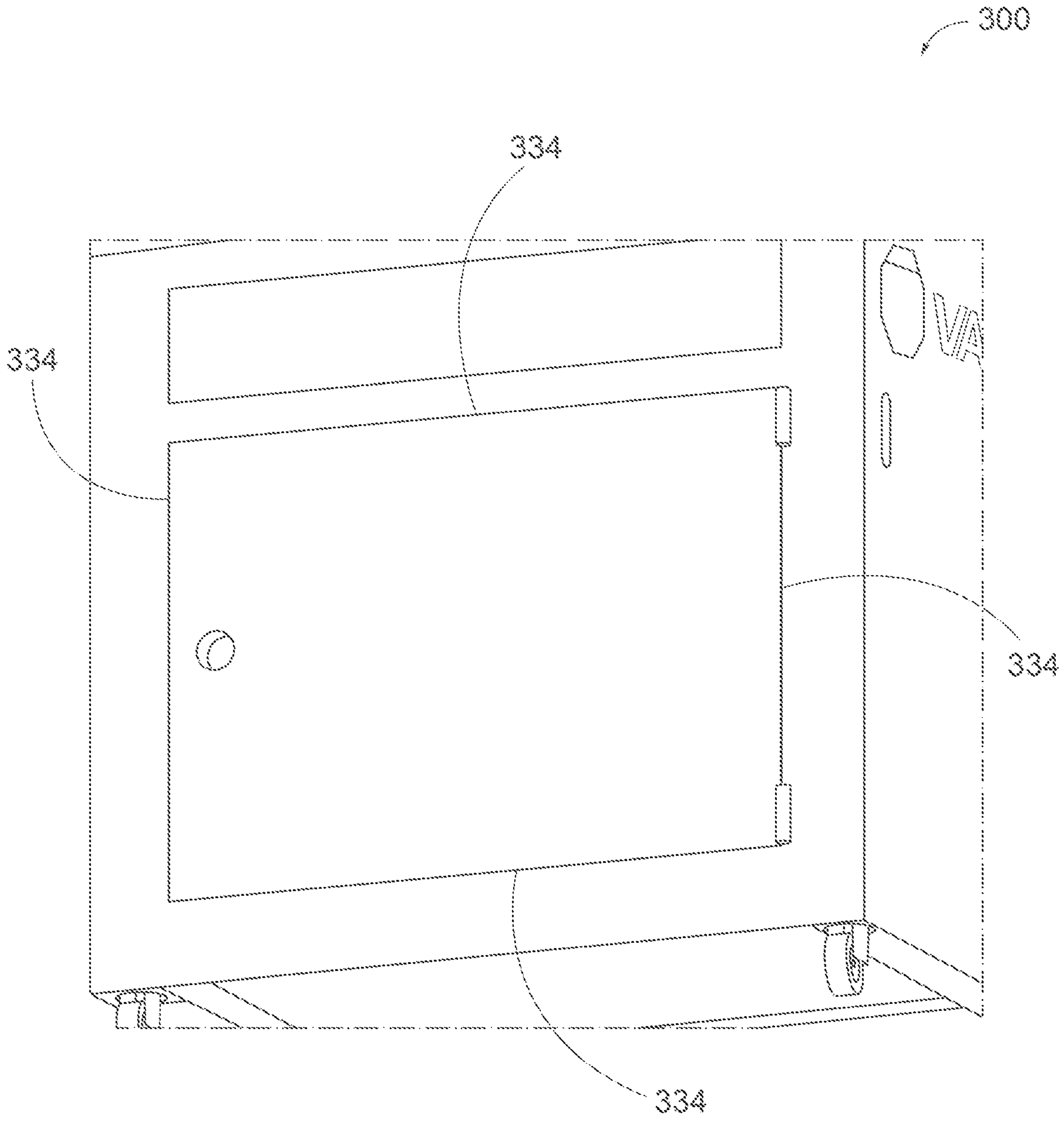
FIG. 3C shows a diagram of a valet podium door, according to an aspect of this disclosure.

FIG. 3C shows an embodiment of a podium 300 comprising a gap 334 between the door 302 and the door frame of the secured storage area 316. In an embodiment, the gap is no more than about 3/16 of an inch when the door 302 is in the closed position. This sized gap 334 between the door 302 and the door fame of the secured storage area 316 makes it more difficult for an unauthorized entrant to use a leveraging device to gain entrance to the secured storage area 316. It should be appreciated that the gap 334 between the door 302 and the door frame could be greater than 3/16 of an inch, however, the larger the gap 334, the easier it would for an unauthorized entrant to use a leveraging device to gain entrance to the secured storage area 316. The door 302 may comprise a first locking member with the door frame comprising a second locking member, wherein the first and second locking members are configured to be coupled together to secure the door 302 in a closed position. In an embodiment, the first locking member is a lock, and the second locking member is a strike plate and frame 326. In an embodiment, the first and second locking members form a locking system. The shape of the door 302 described helps to increase the amount of force required to leverage the door 302 to the open position when the door 302 is secured in the closed position. The locking system and the shape of the door 302 may be configured in a way so as to render 1,000 pounds of force insufficient to pull the door 302 to an open position from the closed position when the first and second locking members are coupled to each other. The 1,000 pounds of force may be in any direction, for example, toward or away from the secured storage area 316. Further, the first and second locking members may remain coupled to each other when at least 1,000 pounds of force is used to pull the door towards an open position from the closed position.

Figure 3D:
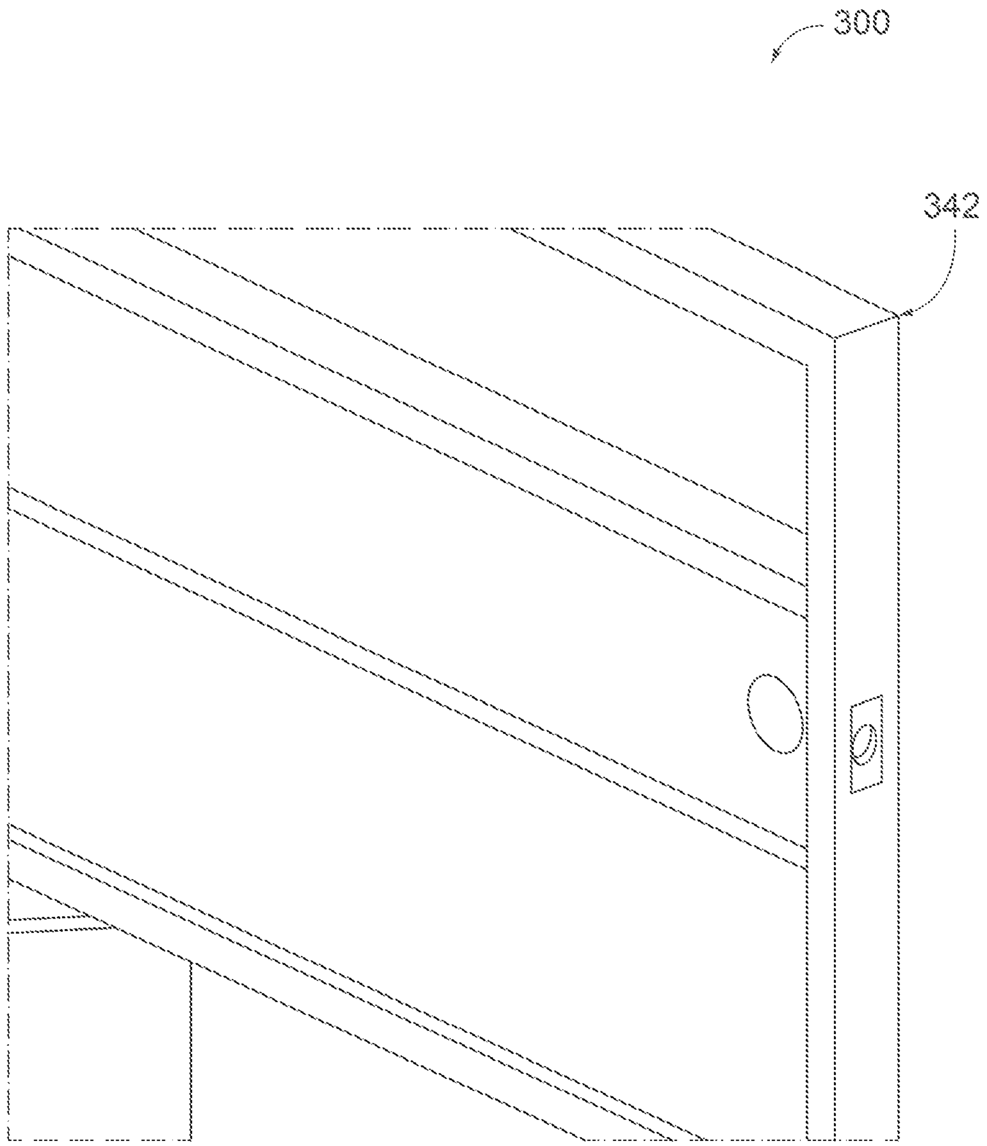
FIG. 3D shows a diagram of valet podium door, according to an aspect of this disclosure.

FIG. 3D shows a strengthened section 342 of the door 302 of the podium that may be constructed by at least metal break-forming one or more materials and securing the one or more materials to reinforce the door 302. The one or more materials may comprise at least one of: (a) the main body of the door; (b) at least one door frame abutment body; and (c) at least one door support body. It should be appreciated that other methods of constructing the door may be used in addition to or alternatively from metal break-forming one or more materials and securing the one or more materials to reinforce the door 302. This strengthened section 342 creates structural reinforcement for the door to prevent the door from being leveraged to the open position from a closed position when the first and second locking members are coupled together. In addition to forming the strengthened section through metal break-forming, the door 302 may be further strengthened by adding structural angle, tubing, or structural members to the inside of the door.

Figure 4:
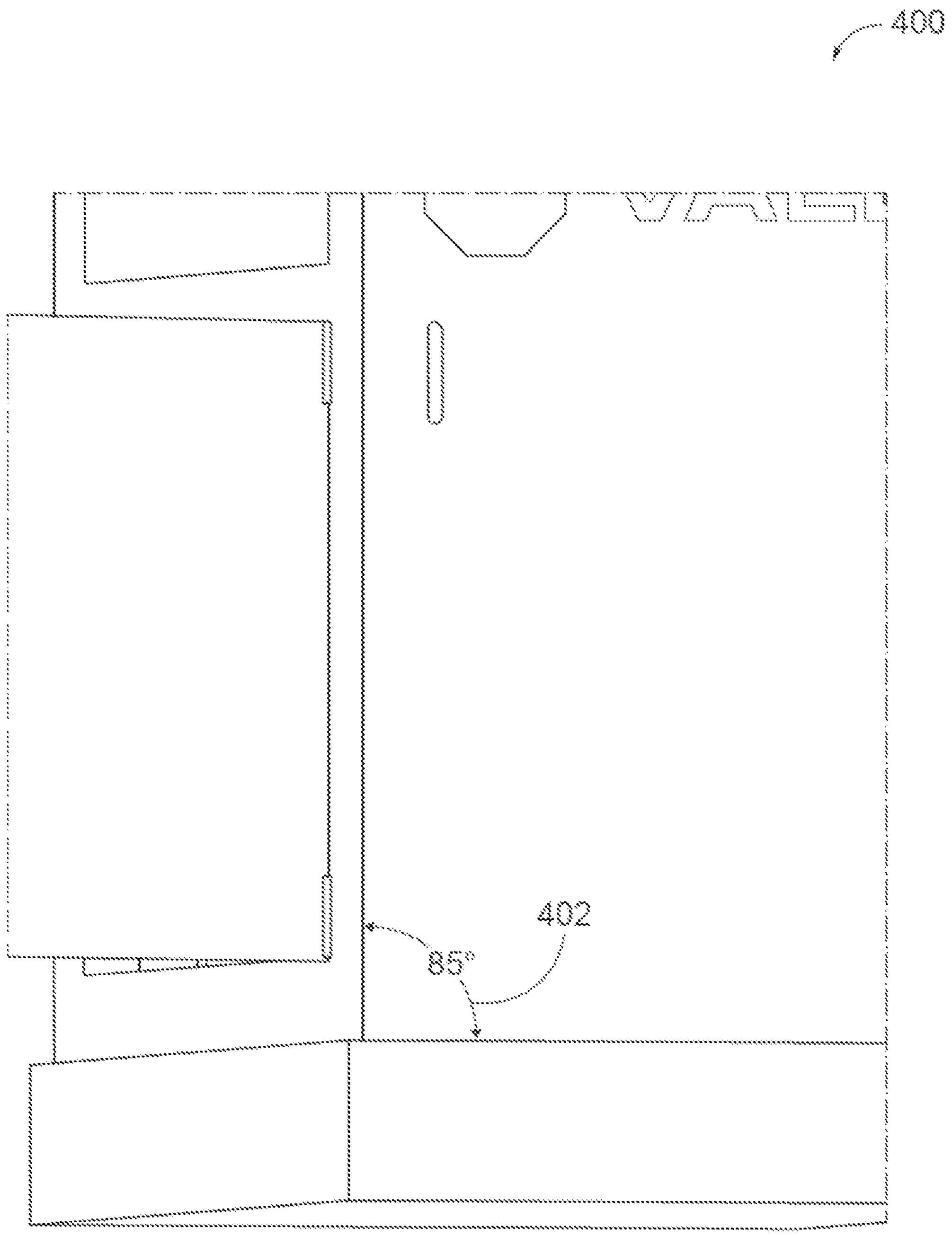
FIG. 4 shows a diagram of a valet podium, according to an aspect of this disclosure.

FIG. 4 shows an embodiment of a podium 400 where the door of the secured storage area is angularly offset from the base of the secured storage area by an angle 402. In an embodiment, the angle 402 ranges from about 75 degrees to about 85 degrees so that gravity biases the door towards a closed position when the door is in an open position. The angular offset 402 of the door from the base can be in addition to or an alternative to the spring-loaded hinges that may also bias the door towards a closed position when the door is in an open position.

Figure 5:
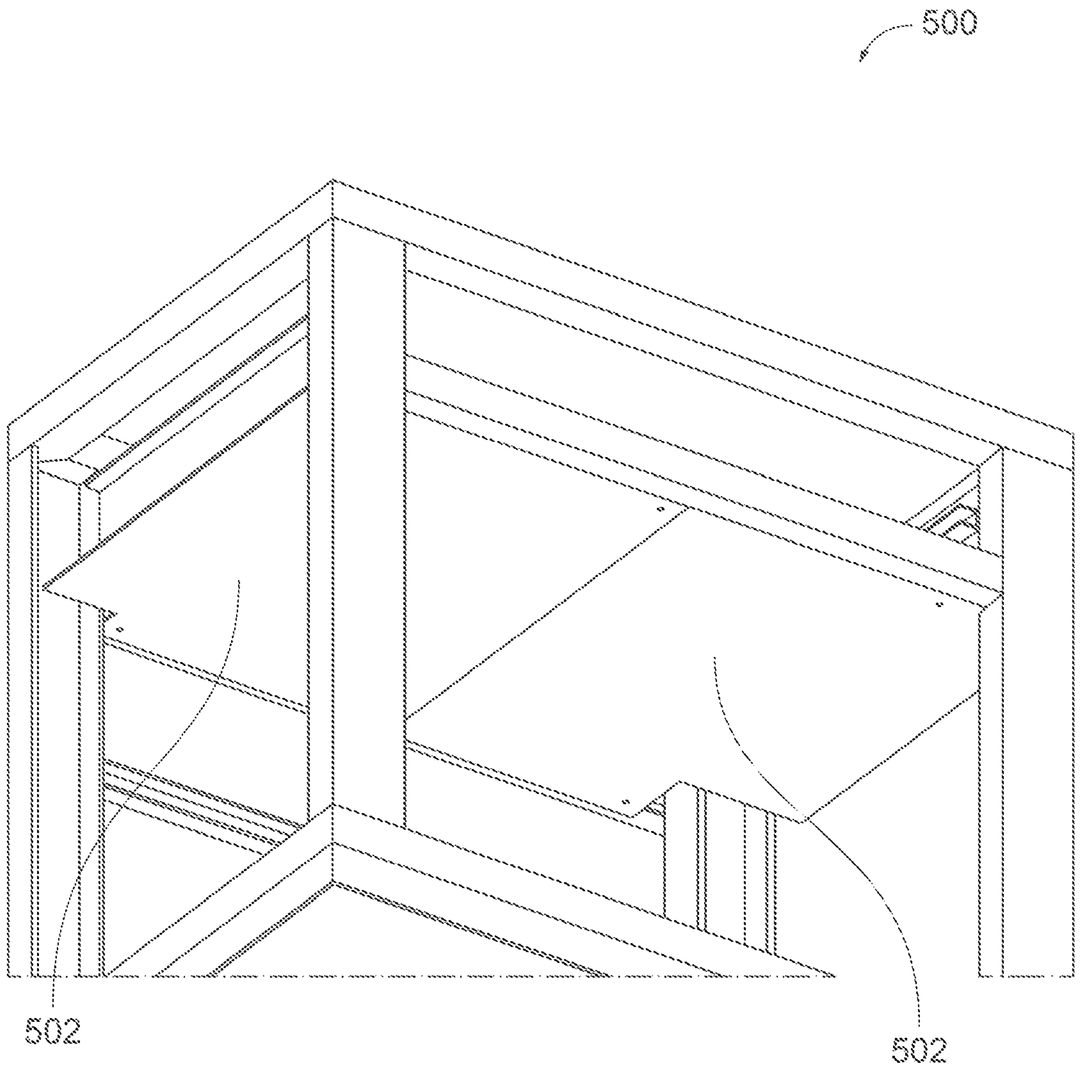
FIG. 5 shows a diagram of a valet podium security plate, according to an aspect of this disclosure.

FIG. 5 shows an embodiment of a podium 500 comprising a security plate 502. The security plate 502 may be laterally spaced between the at least one illuminated sign and the secured storage area. The security plate 502 may additionally or alternatively be laterally spaced between the secured storage area and a drawer space configured to house the lockable utility drawer. In an embodiment, the security plate 502 may define the top surface of the secured storage area and the bottom surface of the drawer space. The security plate 502 may be substantially parallel to the base.

Figure 6:
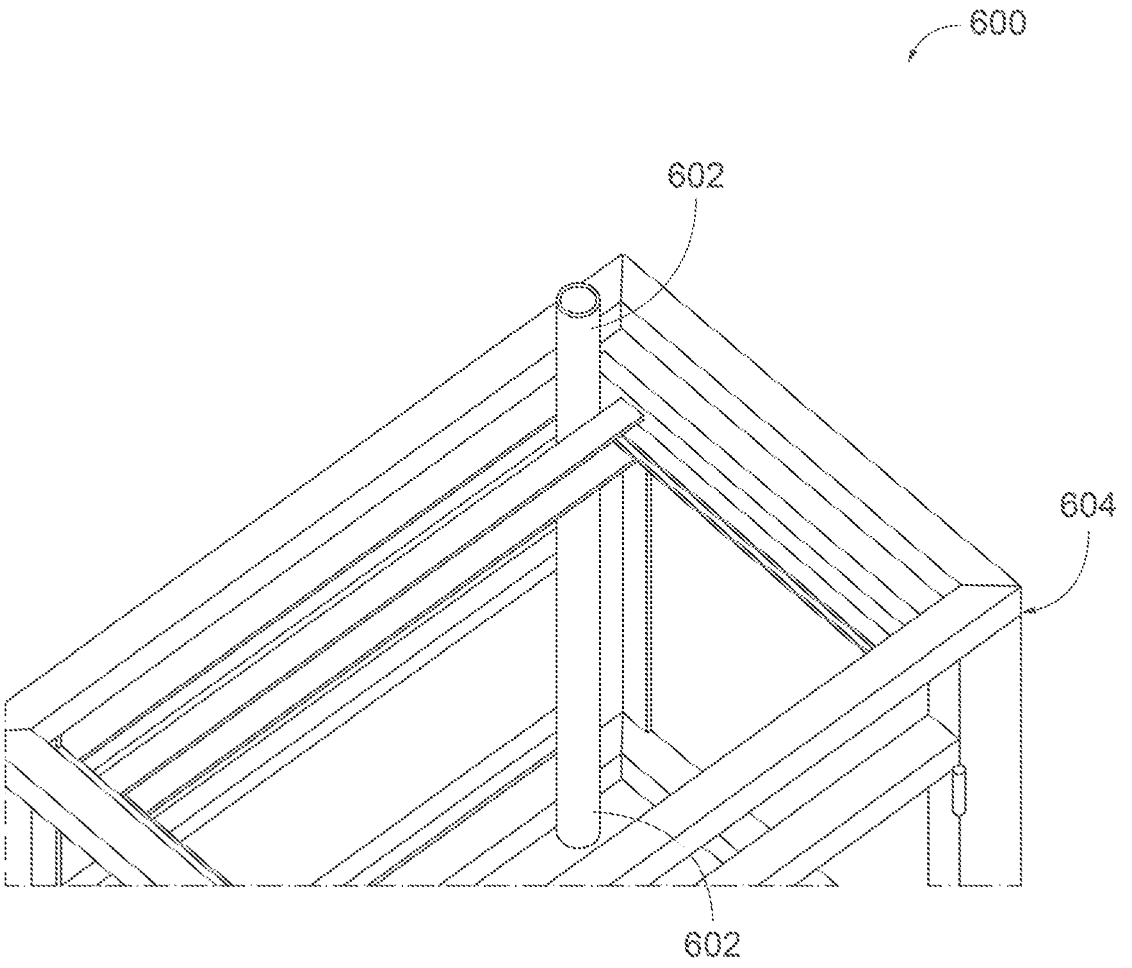
FIG. 6 shows a diagram of a valet podium umbrella holder, according to an aspect of this disclosure.

FIG. 6 shows an embodiment of a podium 600 comprising a first tubular structure 602 that extends from the base of the secured storage area and extends out of the desktop 604. The first tubular structure 602 defines a first channel having a first inner diameter where the first channel is configured to receive a second tubular structure having a second outer diameter, wherein the second outer diameter is less than the first inner diameter. The first tubular structure 602 may be an umbrella holder 602. The second tubular structure may be a portion of an umbrella that can protect valet personal from inclement weather, for example. The configuration of the first tubular structure 602 extending from the base of the secured storage area to at least the desktop surface 604 helps to prevent the unintended discharge of the second tubular structure from the first tubular structure 602, for example, caused by wind lifting an umbrella out of an umbrella holder 602 or blowing the podium 600 over such that the podium 600 is no longer in an upright position.

Figure 7:
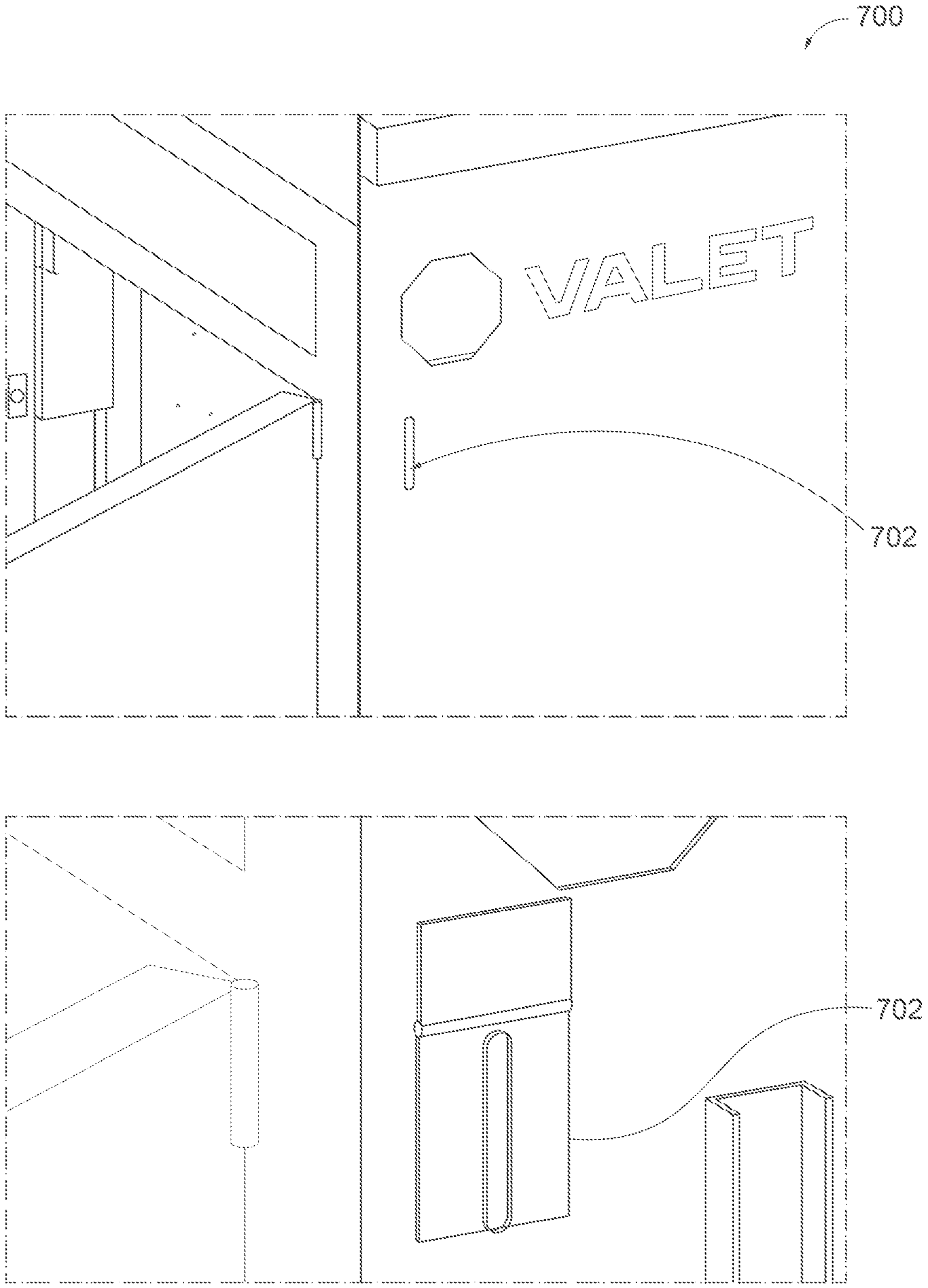
FIG. 7 shows a diagram of a valet podium gratuity slot, according to an aspect of this disclosure.

FIG. 7 shows an embodiment of a podium 700 comprising a gratuity slot 702 defined by an exterior side configured to allow for the dispensing of paper money from the environment into the secured storage area without opening the door to the secured storage area. The gratuity slot 702 is rectangularly shaped and has dimensions of about 3 inches by about ¼ inches. The gratuity slot 702 may be located such that the items dropped into the gratuity slot 702 drop to a space between the door and a key board. This can help prevent money, car keys, and other items from dropping to a location that is not easily accessible.

Referring to FIG. 1, additionally or alternatively to the gratuity slot 702, a podium 100 may comprise a key drop 102 defined by an exterior side configured to allow for the dropping of keys from the environment surrounding the podium 100 to the secured storage area 108. The key drop 102 may be circularly shaped and 3 inches or less in diameter. In an embodiment, a podium 100 has a key drop 102 and a gratuity slot 702, wherein both lead from the environment surrounding the podium 100 to a space within the secured storage area 108 between the door 104 and the key board.

Figure 8:
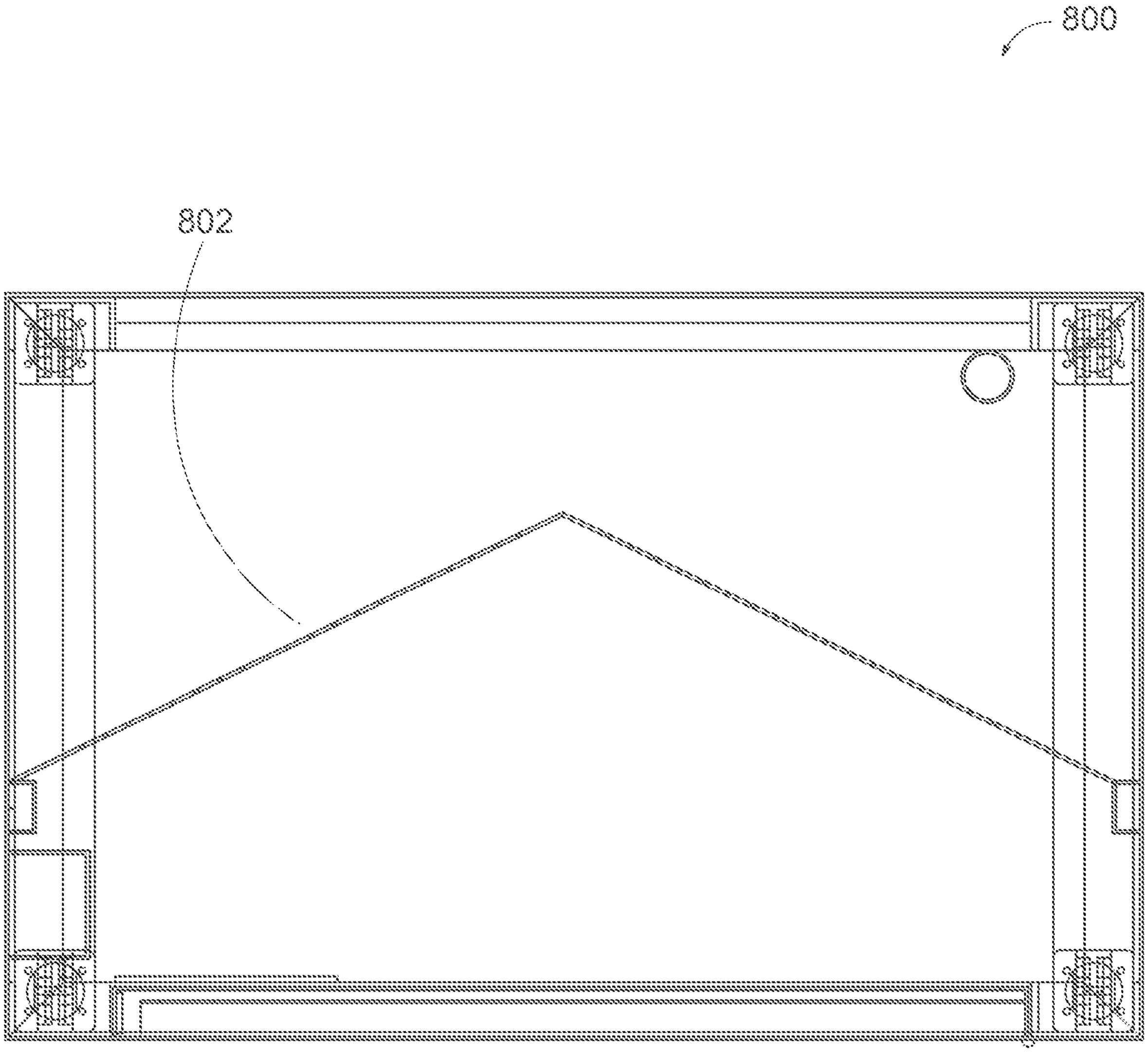
FIG. 8 shows a top view of a valet podium with a key board, according to an aspect of this disclosure.

FIG. 8 shows a top view of a valet podium 800 comprising a key board 802.

Figure 9:
FIG. 9 shows a side view of a valet podium with a key board, according to an aspect of this disclosure.

FIG. 9 shows a side view of a valet podium 900 comprising a key board.

Figure 10:
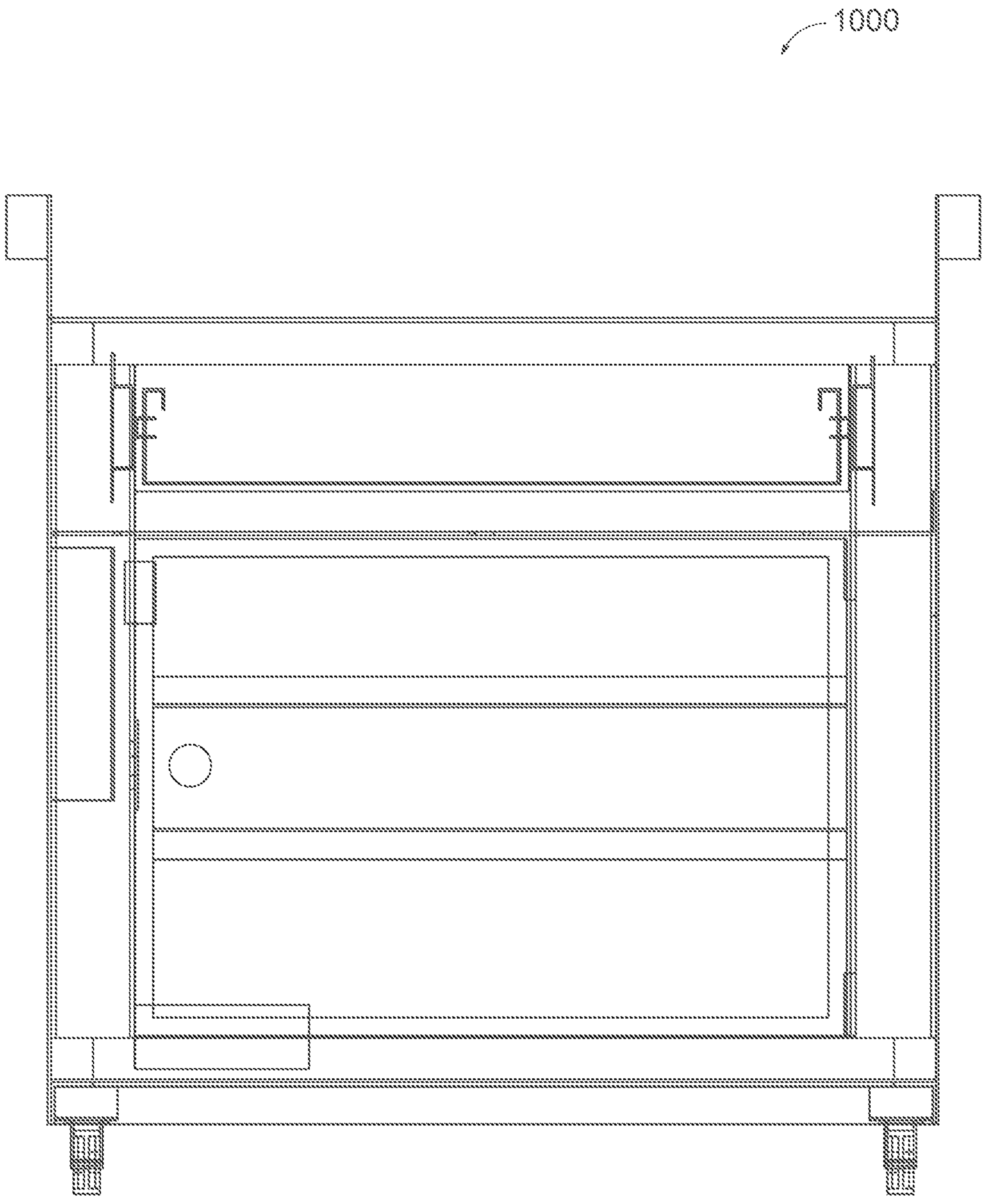
FIG. 10 shows a front view of a valet podium, according to an aspect of this disclosure.

FIG. 10 shows a front view of a valet podium 1000.

FIGS. 11A-11F shows various illustrations and embodiments of a valet vault. The vault 1100 may be mounted to a wall 1199 or wall-like surface. In an embodiment, the vault 1100 comprises a service side 1114, an attachment side 1118, first through fourth exterior sides 1116*a-d*, a lockable utility box 1120, a secured storage area 1108 being accessible through a door 1104 where a hinged end 1135 of the door 1104 is pivotally connected to a door frame 1107 by at least one hinge 1103, and a security plate 1112 substantially separating the secured storage area 1108 and the lockable utility box 1120. The vault 1100 may comprise a key drop 1123. The vault may comprise a catch/latch 1110 to stop the door. The vault 1100 may comprise an illuminatable sign 1124 that does not compromise the security of the secured storage area 1108. The vault according to another embodiment comprises a service side 1114, an attachment side 1118, first through fourth exterior sides 1116*a-d*, and a secured storage area 1108 being accessible through a door 1104 where a hinged end 1135 of the door 1104 is pivotally connected to a door frame 1107 by at least one hinge 1103. The door 1104 may comprise reinforcements 1106.

Figure 11A:
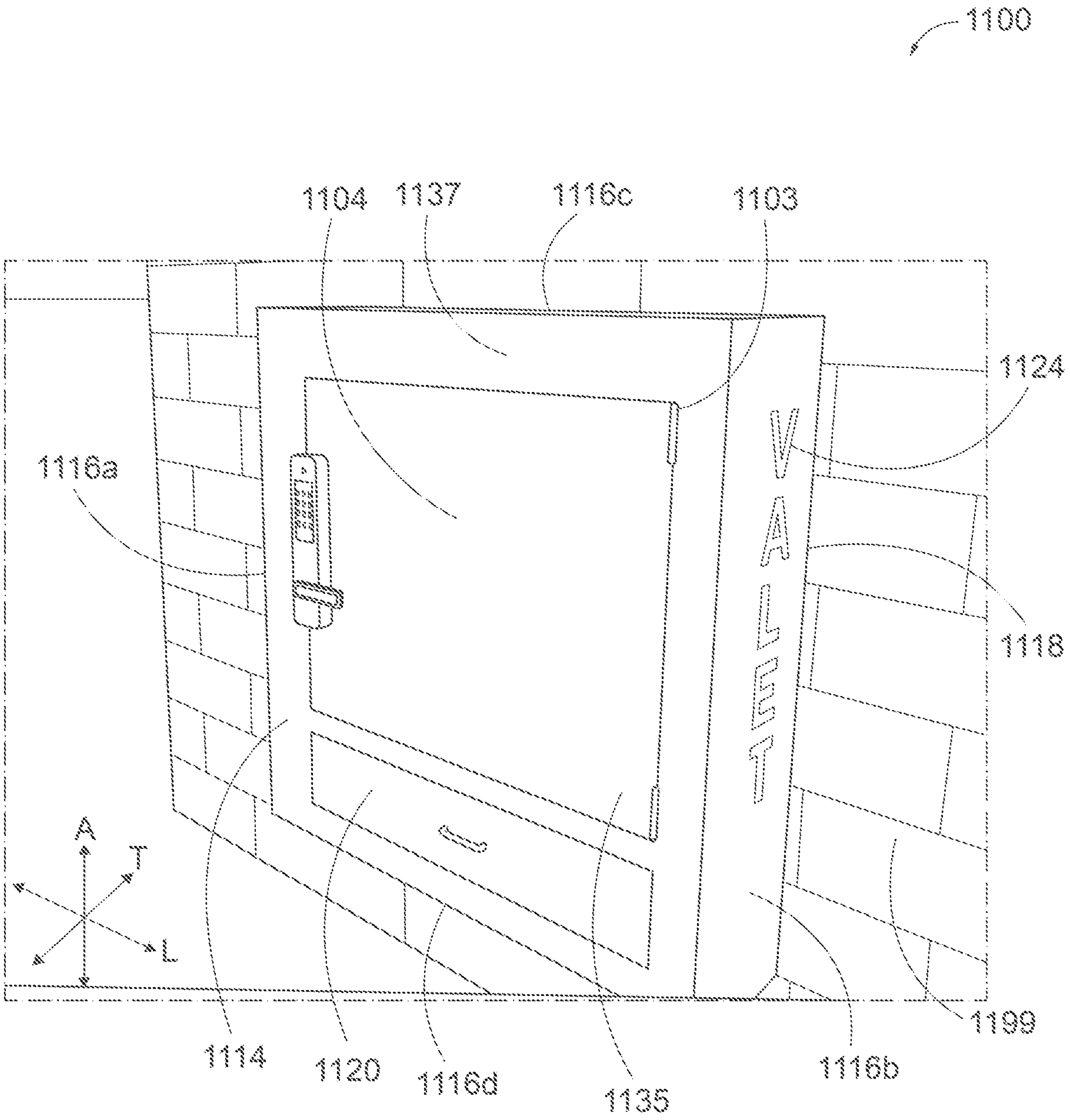
FIG. 11A shows a perspective view of a valet vault, according to an aspect of this disclosure.
Figure 11B:
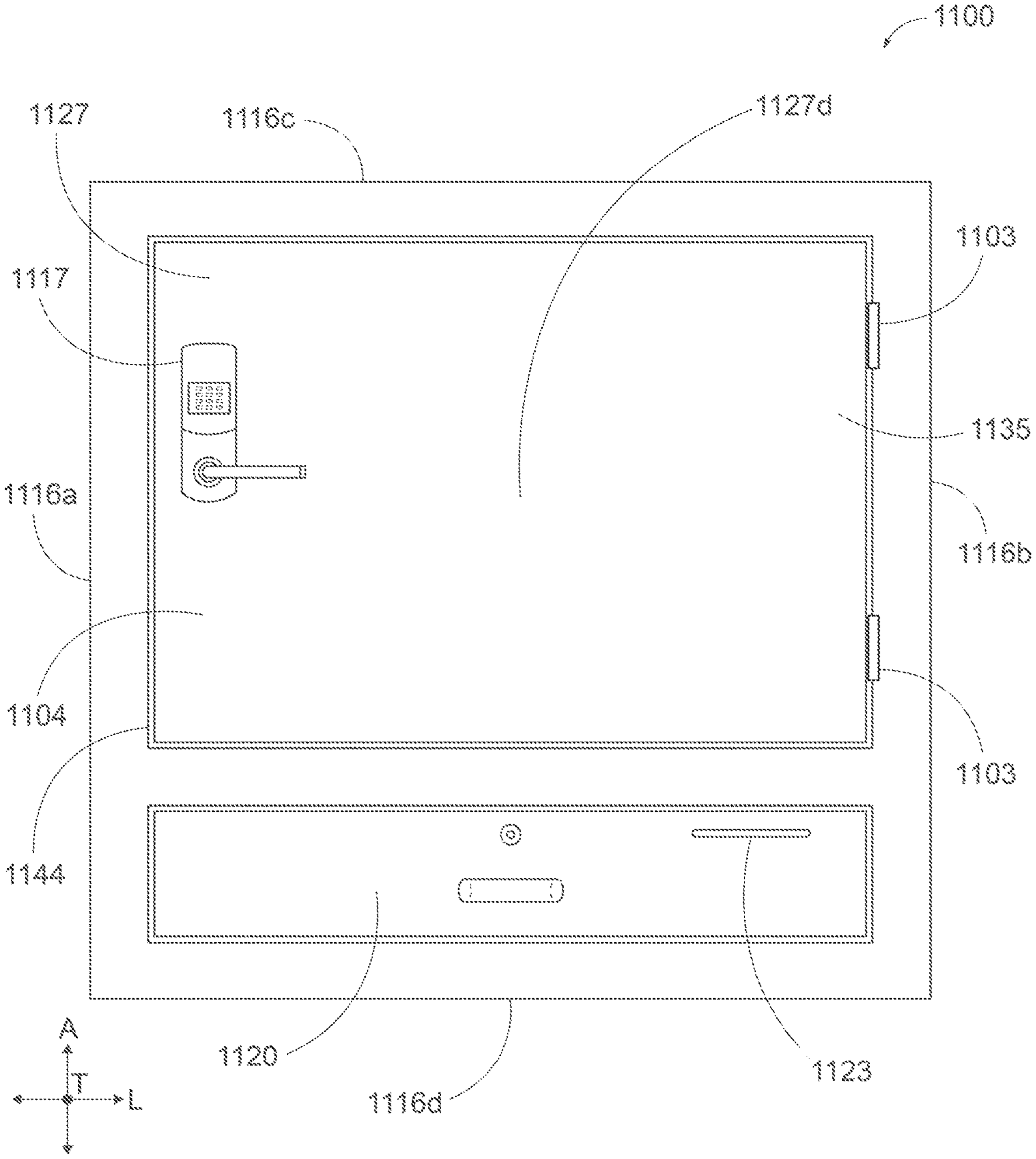
FIG. 11B shows a front view of a valet vault, according to an aspect of this disclosure.

FIG. 11A illustrates a perspective view of a valet vault 1100 attachable to a wall 1199 or a wall-like surface. The service side 1114 is spaced from the attachment side 1118 in the transverse direction T, wherein the service side 1114 is substantially parallel to the attachment side 1118. The first exterior side 1116*a* is spaced from the second exterior side 1116*b* in the longitudinal direction L by the service and attachment sides 1114 and 1118, wherein the first and second exterior sides 1116*a* and 1116*b* are substantially parallel to each other, and the longitudinal direction L is substantially perpendicular to the transverse direction T. The third exterior side 1116*c* is spaced from the fourth exterior side 1116*d* in the lateral direction A by the service and attachment sides 1114 and 1118, wherein the third and fourth exterior sides 1116*c* and 1116*d* are substantially parallel to each other, and the lateral direction A is substantially perpendicular to both the longitudinal direction L and the transverse direction T. The third exterior side 1116*c* may be a top side 1116*c*, and the fourth exterior side 1116*d* may be a bottom side 1116*d*. Together, the service side 1114, the attachment side 1118, and the four exterior sides 1116*a-d*, define a body 1137 of the vault 1100, as shown in FIG. 11D. The body 1137 is constructed from a material, for example, aluminum or an aluminum alloy, which may be at least partially formed via break-forming. The thickness of the material of the body may range from about ⅛ inch to about ¼ inch, for example, 3/16 inch. It should be appreciated that the attachment side 1118 need not be the side that is spaced from the service side 1114 in the transverse direction T. For example, the service side 1114 may be substantially perpendicular to the attachment side 1118 such that the vault is configured to be attached to a wall or surface that is not substantially parallel to the service side 1114, such as a wall or surface that is substantially perpendicular to the service side 1114. Furthermore, the vault 1100 may comprise two or more attachment sides 1118 where the vault 1100 is configured to be coupled to two or more wall 1199 or wall-like surfaces. For example, the vault may comprise: (1) two attachment sides 1118 and three exterior sides 1116; (2) three attachment sides 1118 and two exterior sides 1116; (3) four attachment sides 1118 and one exterior side 1116; or (4) five attachment sides 1118 and no exterior side 1116.

Figure 11C:
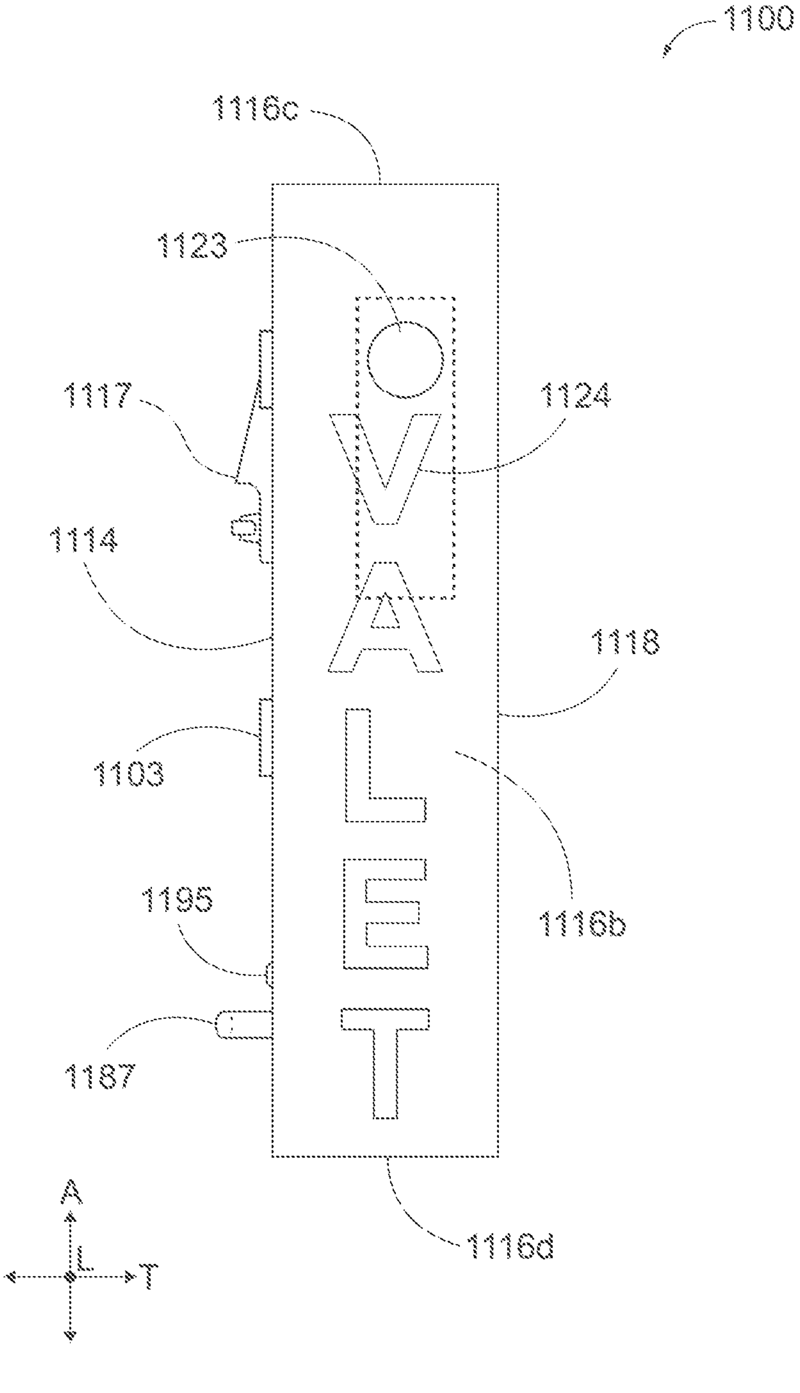
FIG. 11C shows a side view of a valet vault, according to an aspect of this disclosure.
Figure 11D:
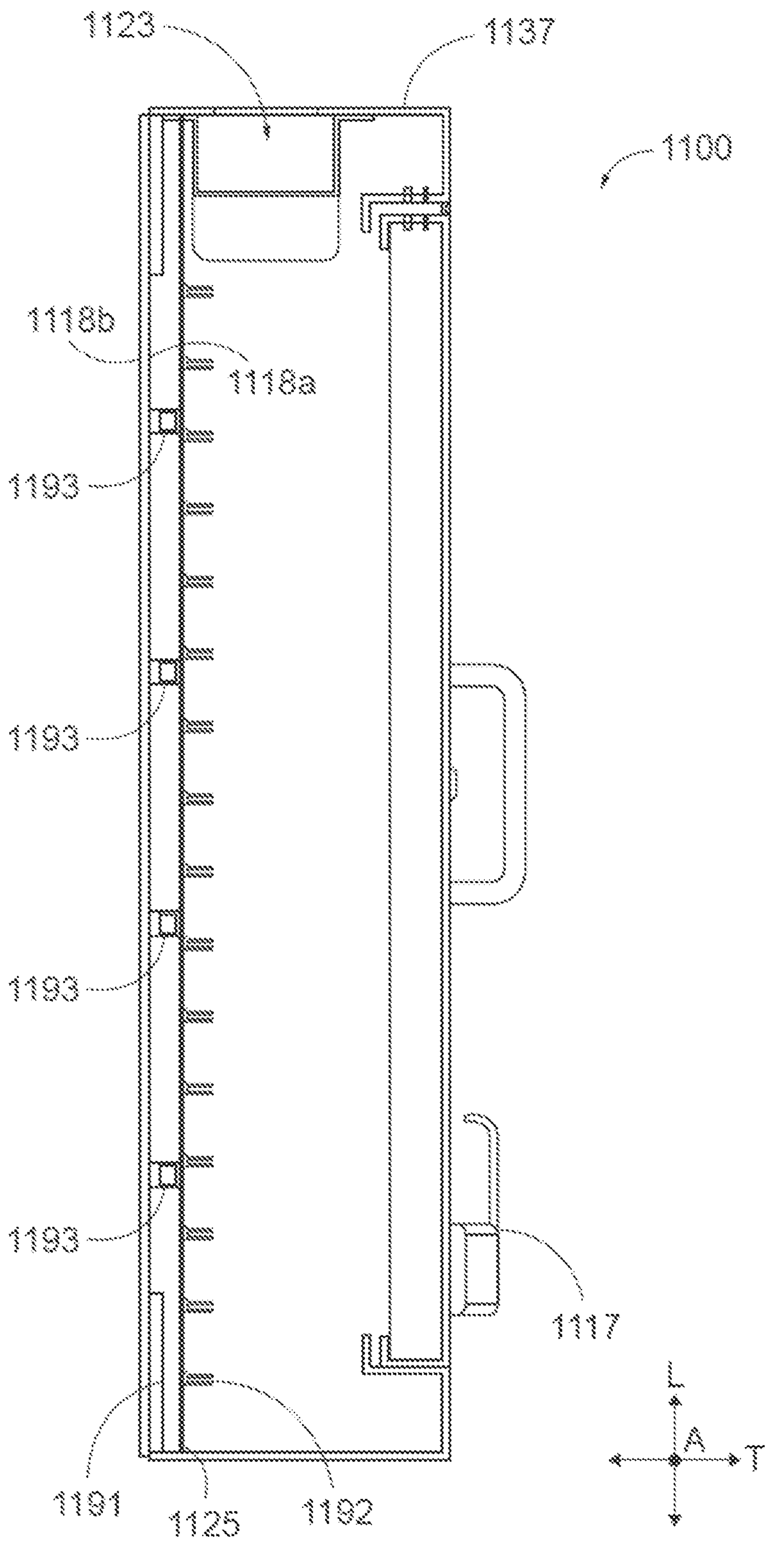
FIG. 11D shows a cross-sectional top view of a valet vault, according to an aspect of this disclosure.

FIG. 11C illustrates a side view of a valet vault 1100, according to an aspect of this disclosure. FIGS. 11A and 11C illustrate a vault 1100 that includes at least one illuminatable sign 1124 defined by at least one of the four exterior sides 1116*a-d*, for example, the second exterior side 1116*b*, wherein the sign 1124 may or may not be internally illuminated or may be made of reflective material. The sign 1124 defined by at least one of the four exterior sides 1116*a-d* is configured in such a way so as to not substantially compromise the security of the secured storage area 1108. The vault 1100 comprising the at least one illuminatable sign 1124 may help drivers or customers in the valet context, for example, by making the location of the valet station easily identifiable, and may further provide an illuminated area for valet workers and employees that may reduce the frequency of work-place accidents.

Figure 11E:
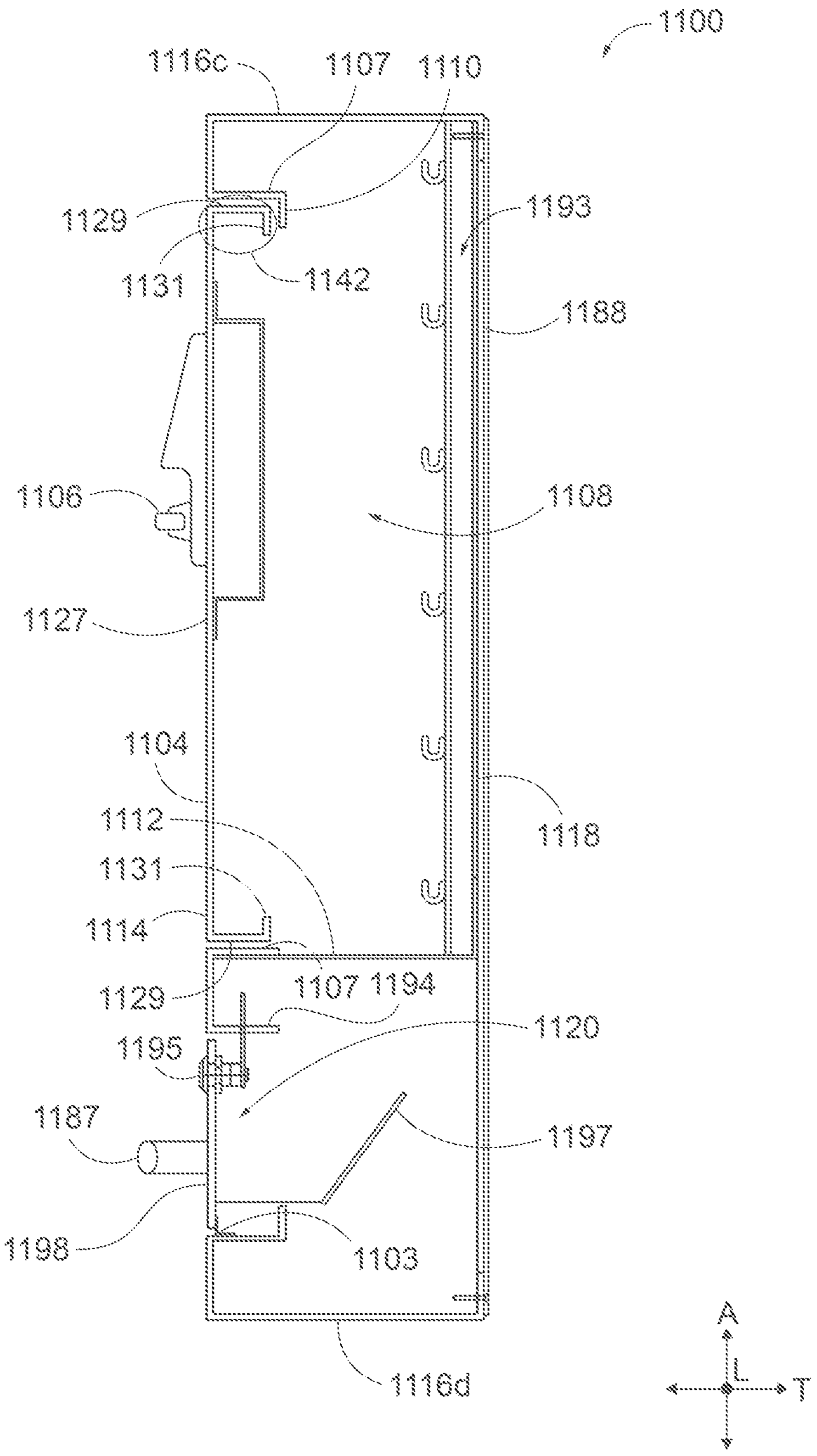
FIG. 11E shows a cross-sectional side view of a valet vault, according to an aspect of this disclosure.
Figure 11F:
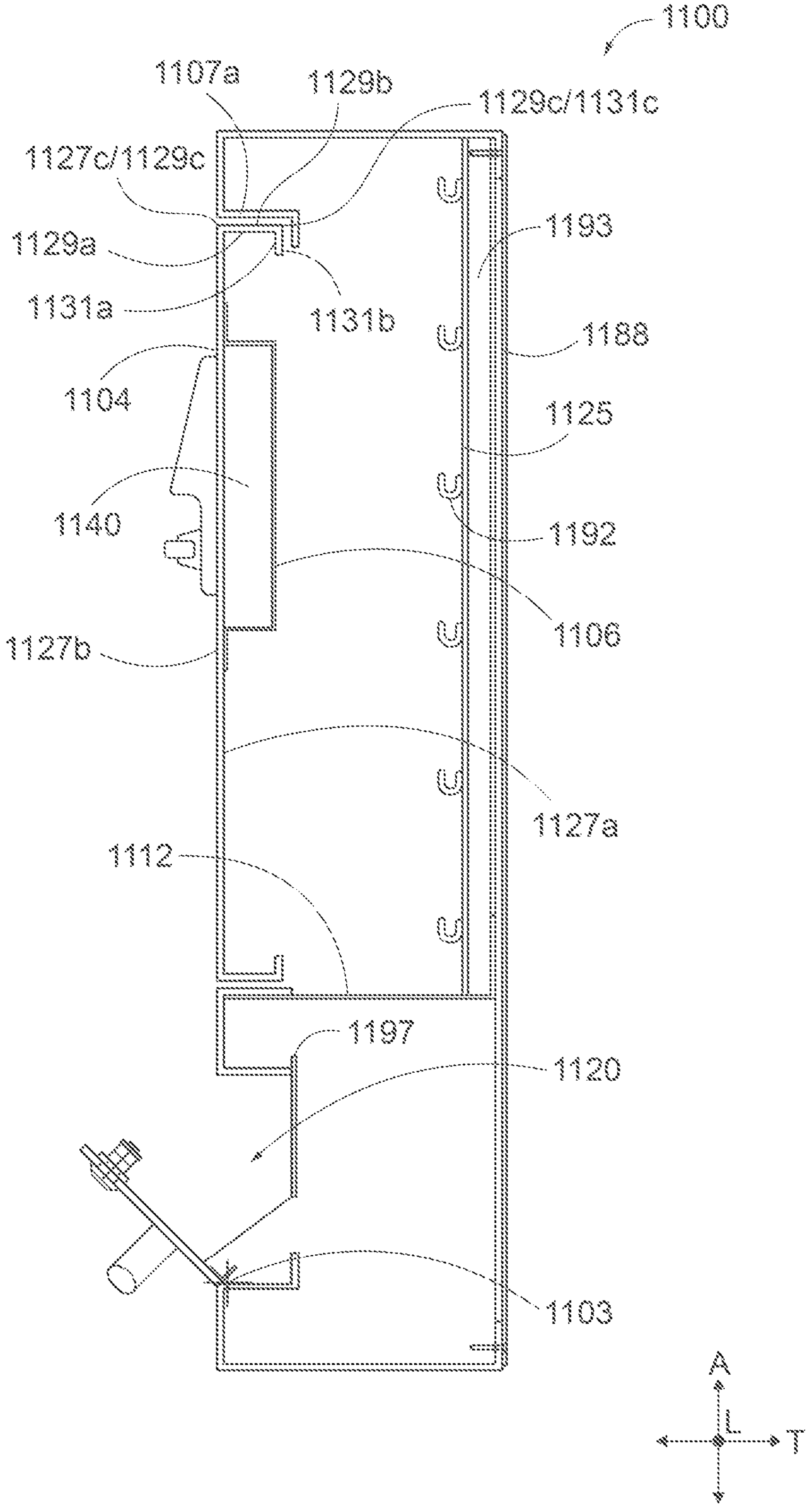
FIG. 11F shows a cross-sectional side view of a valet vault, according to an aspect of this disclosure.

FIGS. 11E and 11F illustrate cross-sectional views of a valet vault 1100, according to aspects of this disclosure. The security plate 1112 is laterally spaced between the top side 1116*c* and the bottom side 1116*d*, wherein the security plate 1112 is substantially parallel to both the top and bottom sides 1116*c* and 1116*d*. The security 1112 may be additionally positioned such that it substantially separates the area defining the secured storage area 1108 from the area defining the lockable utility box 1120. The security plate 1112 may be both a bottom surface of the secured storage area 1108 and a top surface of the utility box 1120. It should be appreciated, however, that the security plate 1112 may be in any orientation desirable to maintain security and protect the contents within the secured storage area 1108 with or without the lockable utility box door 1198 in an open position. The security plate 1112 may be formed and shaped by metal break-forming. The security plate 1112 may be secured by welding the plate 1112 in to place, or by any other means sufficient to secure the plate 1112 in to place.

Continuing to refer to FIGS. 11E and 11F, an embodiment of the vault 1100 comprises a lockable utility box 1120, wherein the lockable utility box 1120 is defined by the space between the security plate 1112 and the fourth exterior side 1116*d* in the lateral direction A, the space between the first and second exterior sides 1116*a* and 1116*b* in the longitudinal direction L, and the space between the service side 1114 and the attachment side 1118 in the transverse direction T. A utility box door 1198 may be pivotally attached to the service side 1114 of the vault 1100 via one or more hinges 1103, where the utility box door 1198 leads from the environment surrounding the vault 1100 to the space defining the lockable box 1120. The one or more hinges 1103 may be a spring-loaded hinge 1103, such that the one or more hinges 1103 biases the utility box door 1198 towards a closed position (shown in FIG. 11E) when the utility box door 1198 is in the open position (shown in FIG. 11F). If there is more than one hinge, some hinges 1103 may be spring loaded while others are not. The one or more hinges 1103 may or may not be the same type of hinge 1103 that is used to pivotally connect the door 1104 of the secured storage 1108 to the service side 1114 of the vault 1100. The hinge 1103 for the box door 1198 may be a continuous hinge 1103 welded into place. The lockable utility box 1120 may further comprise a handle 1187 so a user may easily move the box door 1198 between an open and closed position. The handle 1187 may be a Powder Coated Aluminum Pull Handle. The lockable utility box 1120 may further comprise a door stop 1197 configured to prevent the box door 1198 from being substantially pivoted inward toward the space defining the utility box 1120, or pivoted outward toward the environment, enough to allow an unauthorized person from accessing any valuables or objects contained in the box 1120. The lockable utility box 1120, together with the with security plate 1112, may be configured in such a manner so as to not compromise the security of the secured storage area 1108, regardless of whether access gained to the space defining the lockable utility box 1120 is authorized or unauthorized. The lockable utility box door 1198 may comprise a lock 1195 configured to engage a panel 1194 to secure the utility box door 1198 in the closed position. For example, the lock 1195 may be a Gatehouse 1⅜-inch Die Cast Cam Lock.

Additionally or alternatively, the vault may include a lockable utility drawer (not pictured) slidably disposed in the vault such that the drawer is movable between an open and closed position. The lockable utility drawer also may be completely removed; however, the removal of the lockable utility drawer does not substantially compromise the security of the secured storage area 1108. This solves the problem of people removing a drawer to gain access to car keys or other valuables valet personal would store in the secured storage area.

In an embodiment, the vault body 1137 is made from aluminum, steel, stainless steel, or any other material one skilled in the art would use to construct such a vault. It should be appreciated that the vault can be made from a combination of materials. The vault body 1137 may include an inscribed serial number to enable tracking of the podium in the event that the entire vault body 1137 is stolen. The vault body 1137 may include a device or circuitry capable of communicating via radio frequency to enable tracking of the podium in the event that the entire vault body 1137 is stolen.

In an embodiment, the vault 1100 comprises at least one catch 1110, wherein a portion of the at least one catch 1110 is coupled to a portion of the door frame 1107 of the secured storage area 1108, with substantially all of a remaining portion of the at least one catch 1110 being configured to catch the door 1104 and prevent the door 1104 from pivoting into the secured storage area 1108. The at least one catch 1110 further prevents unauthorized persons from kicking the door into the secured storage area 1108 to gain access to the valuables contained therein. The at least one catch 1110 further prevents torqueing or twisting of the door 1104 should a leveraging device be used to attempt to pry the door 1104 to an open position when the door 1104 is secured in the closed position.

In an embodiment, the door 1104 of the secured storage area 1108 comprises a main body 1127, four frame abutment bodies 1129, and four door support bodies 1131. Combined, the main body 1127, the four frame abutment bodies 1129, and the four door support bodies 1131 may form a strengthened section 1142 of the door. The strengthened section 1142 may further comprise an adjoining member (not pictured). The main body has an interior surface 1127*a* and an exterior surface 1127*b*; the four frame abutment bodies 1129 each have an interior frame abutment surface 1129*a* and an exterior frame abutment surface 1129*b*; and the four door support bodies each have an interior surface 1131*a* and an exterior surface 1131*b*. Each frame abutment body 1129 is orthogonally attached to the main body 1127 such than an elongated edge 1129*c* of each door frame abutment body 1129 is attached to a different edge 1127*c* of the main body 1127 and extending inward toward the secured storage area 1108 when the door 1104 is in the closed position. The door support bodies 1131 are orthogonally attached to a corresponding edge 1129*c* of a door frame abutment body 1129 such that an elongated edge 1131*c* of each door support body 1131 is orthogonally connected to a corresponding edge 1129*c* of a corresponding door frame abutment body 1129 and extending toward a center 1127*d* (as shown in FIG. 11B) of the main body 1127 of the door 1104, with the door support bodies 1131 being substantially parallel to the main body 1127. It should be appreciated that this is just one example embodiment, and the door 1104 may contain more or less door support bodies 1131 or door frame abutment bodies 1129 depending on the needs of the user. It should be appreciated that the door 1104 can be shaped from a single piece of material by metal break-forming or other similar manufacturing methods known in the art. It should further be appreciated that the embodiment just described assumes a door 1104 of a rectangular shape, however, the door 1104 may be of any shape with a corresponding door frame 1107 shape, and the number of frame abutment bodies 1129 and door support bodies 1131 corresponding to the number of edges 1127*c* the main body 1127 of the door 1104 has.

Additionally, at least one door support body 1131 might be attached to at least one of its orthogonally adjacent support bodies 1131 by an adjoining member, thereby increasing the strength of the door 1104.

The door 1104 may comprise additional material to act as a reinforcement section 1106 for the door 1104 so as to increase the force required to leverage the door 1104 to the open position. There may be more than one reinforcement section 1106, where each reinforcement 1106 has a central axis (not pictured), and the central axis is extended in a lateral, longitudinal, diagonal direction, or any desired direction along the interior surface 1127*a* of the main body 1127 of the door 1104 for the secured storage area 1108. It should be appreciated that if there is more than one reinforcement section 1106, the central axis of each may extend in the same or different direction of the others. The reinforcement section 1106 may be further configured to cover internal lock components coupled to the interior surface 1127*a* of the door 1104. The reinforcement section 1106 may be formed via metal break-forming.

FIG. 11B illustrates a front view of a valet vault 1100, according to an aspect of this disclosure, wherein the door 1104 to the secured storage area 1108 is pivotally connected to the door frame 1107 of the secured storage area by at least one hinge 1103. The at least one hinge 1103 may be spring loaded so that when the door 1104 is left in the open position, the spring hinge will bias the door 1104 towards a closed position. If a hinge 1103 is spring loaded, it may be, for example, a Cauldham Heavy Duty Self Closing Door Hinge or the like. The spring-loaded hinge 1103 helps eliminate the problem of doors 1104 being accidentally left open. If there is more than one hinge 1103, it should be appreciated that not all the hinges 1103 must be spring loaded if at least one of the hinges 1103 are spring loaded. For example, in an embodiment with two hinges 1103, one hinge 1103 can be spring loaded, while the other hinge 1103 is not spring loaded; or in an embodiment with three hinges 1103, one hinge 1103 can be spring loaded while the other two hinges 1103 are not spring loaded. This prevents the door 1104 of the secured storage area 1108 from being left open so that persons not authorized to access the secured storage area 1108 are not easily able to gain access to the secured storage area 1108 and valuables contained therein.

Referring to FIGS. 11E and 11F, the service side 1114 defines a door frame 1107 that may include a latch/catch 1110 having a ⅛-inch aluminum threshold, verses a plate, to stop the door. The vault 1100 may comprise a strike plate and frame (not pictured) to receive a lock (not pictured) through, which provides improved strength and compensates for any structural weakness in the locking mechanism.

Referring again to FIG. 11B, the vault comprises a gap 1144 between the door 1104 and the door frame 1107 of the secured storage area 1108 of no more than 3/16 of an inch when the door is in the closed position. The gap 1144 between the door 1104 and the door frame 1107 may be further defined by the space between each exterior surface 1129*b* of the four door frame abutment bodies 1129 and a corresponding door abutment surface 1107*a* of the door frame 1107. This sized gap 1144 between the door 1104 and the door fame 1107 of the secured storage area 1108 makes it more difficult for an unauthorized entrant to use a leveraging device to gain entrance to the secured storage area 1108 than if the gap were larger, i.e., greater than 3/16 of an inch. It should be appreciated that, in certain embodiments, the gap 1144 between the door 1104 and the door frame 1107 could be greater than 3/16 of an inch, however, the larger the gap, the easier it would be for an unauthorized entrant to use a leveraging device to gain entrance to the secured storage area 1108.

In an embodiment, the door 1104 comprises a first locking member (not pictured), and the door frame 1107 comprises a second locking member (not pictured), wherein the first and second locking members are configured to be coupled together to secure the door 1104 in a closed position. The first and second locking members comprise a locking system 1117. The locking system 1117 may be a Key Code MC 5510 Electronic Door Handle. In an embodiment, the first locking member is a lock, and the second locking member is a strike plate and frame. The shape of the door 1104 described helps to increase the amount of force required to leverage the door 1104 to the open position when the door 104 is secured in the closed position. The locking system 1117 and the shape of the door 1104 may be configured in a way so as to render 1,000 pounds of force insufficient to pull the door 1104 to an open position from the closed position when the first and second locking members are coupled to each other. The 1,000 pounds of force may be in any direction. Further the first and second locking members may remain coupled to each other when at least 1,000 pounds of force is used to pull the door 1104 to an open position from the closed position. The vault may further comprise a plate guard (not pictured) so when the door 1104 is in the closed position, and the first and second locking member are coupled to each other, the plate guard helps to prevent unauthorized entrants from using a mechanism, for example, a coat hanger or paper door hook, to decouple the first and second locking members and gaining unauthorized access to the secured storage area 1108 and the valuable contained therein.

The door 1104 of the vault 1100 may be constructed by at least metal break-forming one or more materials and securing the one or more materials to reinforce the door 1104. It should be appreciated that other methods of constructing the door may be used in addition to or alternatively from break-forming one or more materials and securing the one or more materials to reinforce the door 1104, creating a strengthened section 1142. Adding structural angle, tubing, or structural members to the inside of the door may be utilized to increase the strength of the door 1104. The one or more materials may comprise at least one of: (1) the main body 1127 of the door; (2) at least one door frame abutment body 1129; and (3) at least one door support body 1131. This strengthened section 1142 creates structural reinforcement for the door 1104 to prevent the door 1104 from being leveraged to the open position from a closed position when the first and second locking members are coupled together.

In an embodiment, the door 1104 of the secured storage area 1108 is angularly offset from the bottom side 1116*d* of the secured storage area 1108 so that gravity biases the door 1104 towards a closed position when the door 1104 is in an open position. The door 1104 may be angularly offset by about 85 degrees, for example. The angular offset can be in addition to or an alternative from the spring-loaded hinges that may also bias the door 1104 towards a closed position when the door 1104 is in an open position.

The podium 1100 may comprise an at least one opening 1123, for example, one or two openings 1123. The at least one opening 1123 is defined by at least one of the first and second exterior sides 1116*a*, the service side 1114, the door 1104, or the box door 1198 that leads from the environment surrounding the vault 1100 to either the secured storage area 1108 or the lockable box 1120. The at least one opening 1123 may be a key drop 1102 that is circularly shaped and 3 inches or less in diameter so a user can drop items, for example, car keys, into either the secured storage area 1108 without opening the door 1104, or into the lockable box 1120 without opening the box door 1198. The at least one opening 1123 may be rectangularly shaped, so as to be configured to receive money and allow money to be easily transferred from the environment to either the secured storage area 1108 without opening the door 1104, or the lockable box 1120 without opening the box door 1198. If an opening 1123 is designed for items to fall into the secured storage area 1108, the opening 1123 may be located such that the items dropped into the opening 1123 fall to a space between the door 1104 and a key board 1125. This can help prevent money, car keys, and other items from dropping to a location that is not easily accessible. In an embodiment comprising a rectangularly shaped opening 1123, that rectangularly shaped opening has dimensions of about 3 inches by about ¼ inches. In an embodiment, the podium 1100 has two openings 1123, where the first opening 1123 is circularly shaped, defined by the second exterior side 1116*b*, and leads from the environment to the secured storage area 1108; and the second opening 1123 is rectangularly shaped, defined by the box door 1198, and leads from the environment to the lockable box 1120.

FIG. 11D illustrates a top view of a valet vault 100, according to an aspect of this disclosure, wherein the vault 1100 comprises at least one support tube 1193 coupled to an interior surface 1118*a* of the attachment side 1118. For example, the vault 1100 may comprise four tubes 1193. The at least one tube 1193 may have a rectangular cross-sectional area defined by the tube 1193. It should be appreciated that the cross-sectional area may be any appropriate shape, for example, circular. The at least one tube may extend in the lateral direction A or the longitudinal direction L. In the lateral direction A, the at least one tube 1193 may extend any distance desired, for example, from the top side 1116*c* to the security plate 1112, or from the top side 1116*c* to the bottom side 1116*d*. In the longitudinal direction, the at least one tube 1193 may extend any desired distance, for example, from the first exterior side 1116*a* to the second exterior side 1116*b*. The at least one tube 1193 may add support to the attachment side 1118, thereby increasing the structural integrity of the vault and increasing the amount of force required to demount the vault 1100 from a wall 1199 or wall-like surface. The at least one tube 1193 may be further coupled between the interior surface 1118*a* of the attachment side and a key board 1125 in the transverse direction T. The key board 1125 may comprise key hooks 1192 or other means for separating and/or organizing keys and/or other valuables. The at least one tube 1193 may be made from aluminum, aluminum alloy, steel, or any other material appropriate under the circumstances. The cross-sectional area of the at least one tube 1193 may be any size appropriate under the circumstances, for example, about: ¼ squared inches, ½ squared inches, ¾ squared inches, or 1 squared inch.

The vault 1100 may further include at least one stiffener 1191 coupled to the interior surface 1118*a* of the attachment side 1118, wherein the stiffener 1191 defines a hole (not pictured) with a center. In an embodiment, the attachment side 1118 defines at least one mounting hole (not pictured), wherein the mounting hole has a central axis extending in the transverse direction. The central axis of the mounting hole may extend or nearly extend through the center of the stiffener hole. The at least one stiffener 1191 may be made of any material desired, for example, aluminum, an aluminum alloy, or steel. The thickness of the at least one stiffener 1191 extending in the transverse direction T may range from about ⅛ inch to about 1 inch, for example, ¼ inch.

In an embodiment, the attachment side 1118 is coupled directly to the wall 1199 or wall-like surface, and secured via a plurality of anchor bolts (not pictured), wherein the bolts extend in the transverse direction T from at least the interior edge of a stiffener hole, through a mounting hole, and to a position within the wall 1199 or wall-like surface where the bolt is securely threadly engaged to the wall 1199 or wall-like surface such that the vault 1100 is secured to the wall 1199 or wall-like surface. The number of stiffeners 1191 may correspond to the number of mounting holes, and the number of bolts used to secure the vault 1100 to the wall 1199 or wall-like surface may evenly correspond to both the number of mounting holes and the number of stiffeners 1191.

Alternatively, a back panel 1188 may be coupled between the wall 1199 or wall-like surface and the exterior surface 1118*b* of the attachment side 1118. The back panel 1188 may be made of any material desired, for example, aluminum, an aluminum alloy, or steel. The thickness of the back panel 1188 extending in the transverse direction T may range from about ⅛ inch to about 1 inch, for example, 3/16 inch. The back panel may have about the same cross-sectional surface area as the exterior surface 1118*b* of the attachment side 1118. In an embodiment, the back panel 1188 is secured to a wall 1199, and the vault 1100 is separately secured to the back panel 1188 without the vault 1100 being directly secured to the wall 1199 other than via the back panel 1188.

Figure 12:
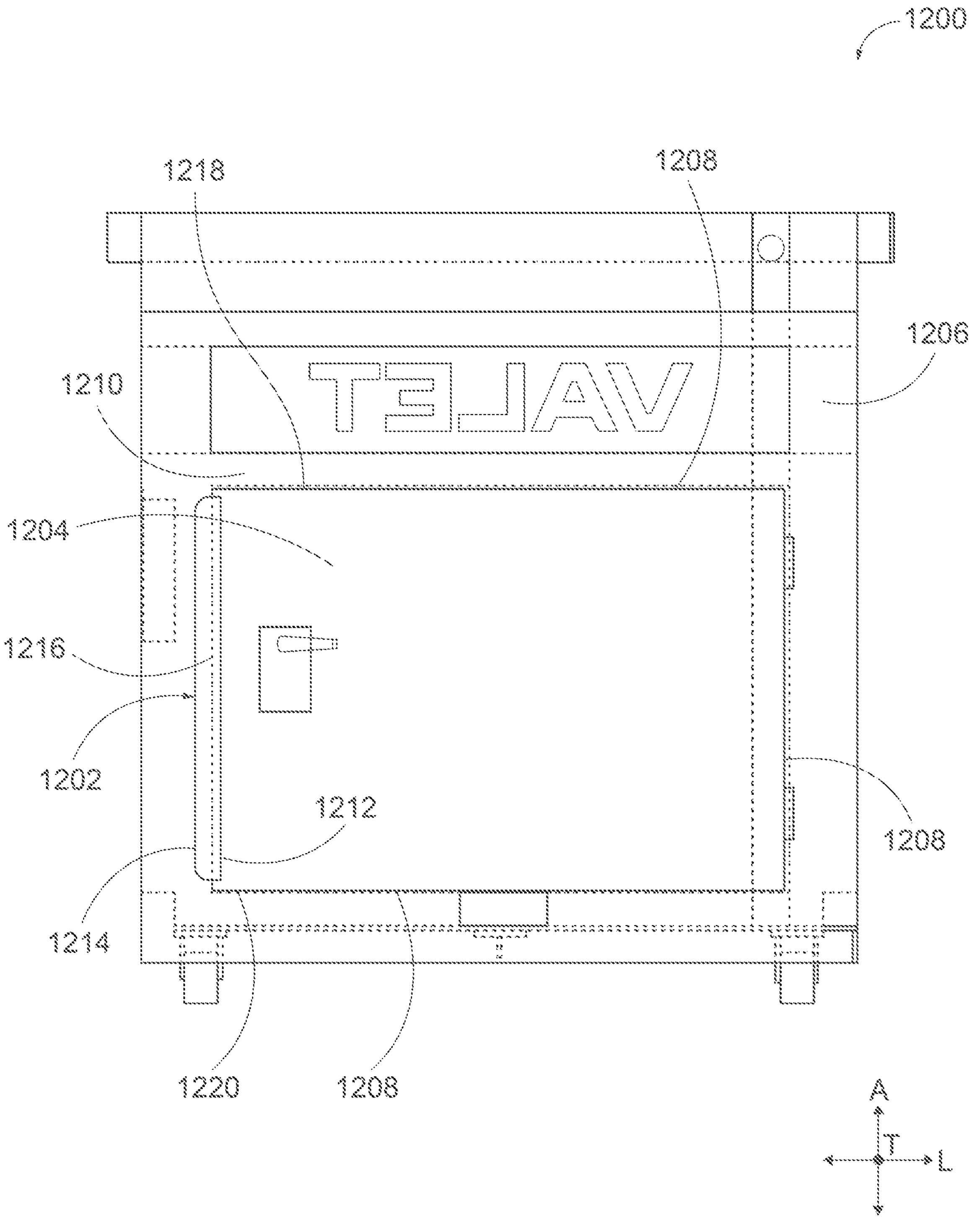
FIG. 12 shows a front view of a valet podium having a plate guard, according to an aspect of this disclosure.

FIG. 12 shows a valet podium 1200 further comprising a plate guard 1202. The plate guard 1202 can be made from a metal, for example, aluminum, an aluminum alloy, steel, or any combination thereof. The plate guard 1202 has a thickness extending in the transverse direction T, for example, about 1/16-inch to about 3/16-inch. A portion of the plate guard 1202 is secured to the door 1204 of the secured storage area at a first area 1212 of the door 1204. In a longitudinal direction L that is substantially perpendicular to the transverse direction T, the plate guard 1202 extends from the first area 1212 to a second area 1214 located on the service side 1206 of the podium 1200 when the door is in the closed position. In an embodiment, the podium 1200 comprises a gap 1208 between the door 1204 and the door frame 1210, wherein a portion of the gap 1208 may be a locking gap 1216 that defines a space for a first locking member to engage a second locking member. The locking gap 1216 is spaced between the first and second areas 1212 and 1214 in the longitudinal direction L. In an embodiment, the plate guard 1202 extends from substantially the same lateral position as the first and second locking members, wherein the plate guard 1202 further extends in the lateral direction A towards a top end 1218 of the door 1204 and/or a bottom end 1220 of the door 1204, and wherein the lateral direction A is substantially perpendicular to both the longitudinal direction L and the transverse direction T. In an embodiment, when the door 1204 is in the closed position, and the first and second locking member are coupled to each other, the plate guard 1202 helps to prevent unauthorized entrants from using a mechanism, for example, a coat hanger or paper door hook, to decouple the first and second locking members and gaining unauthorized access to the secured storage area and the valuable contained therein.

Figure 13A:
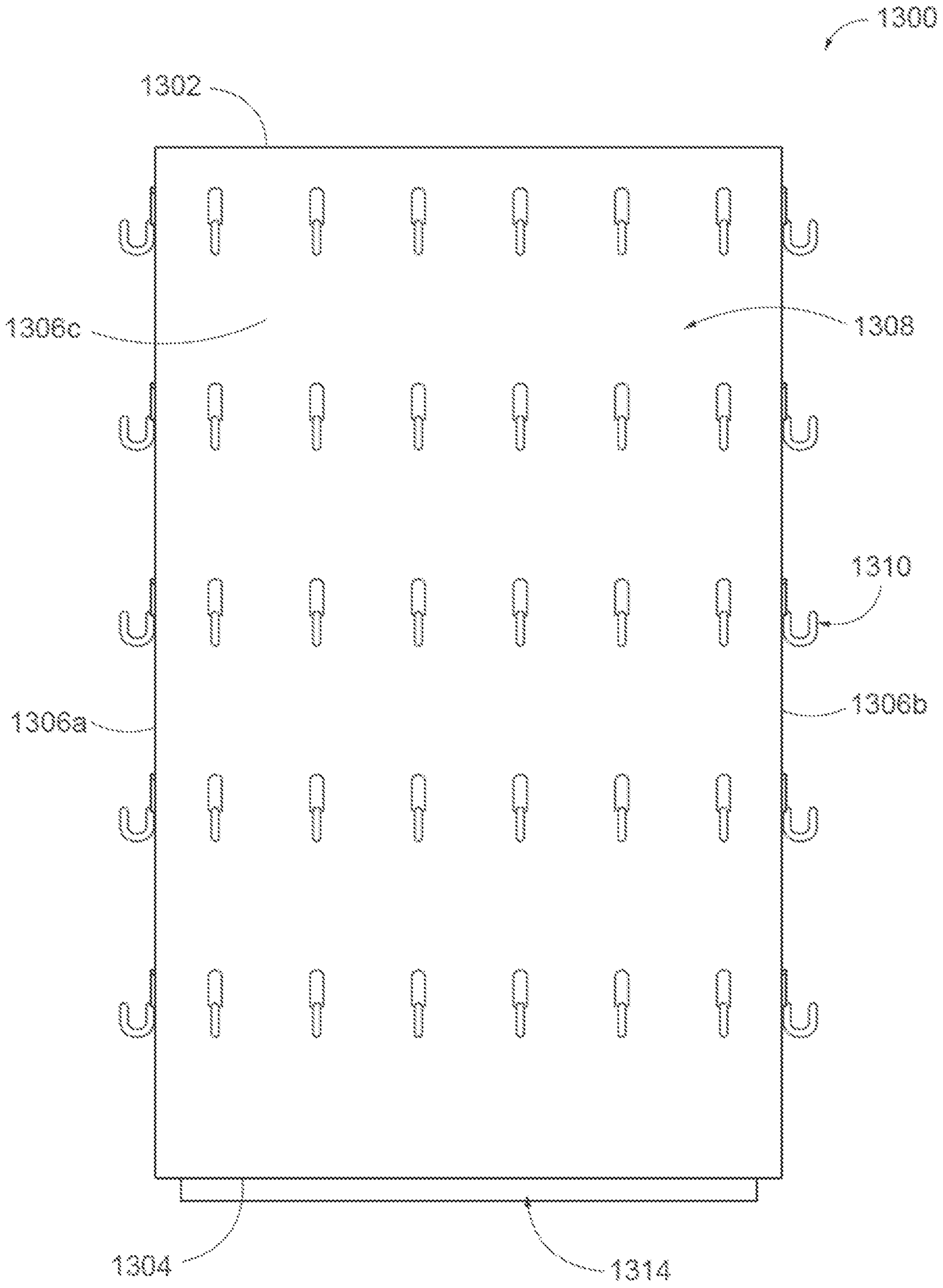
FIG. 13A shows a side view of a carousel keyboard, according to an aspect of this disclosure.
Figure 13B:
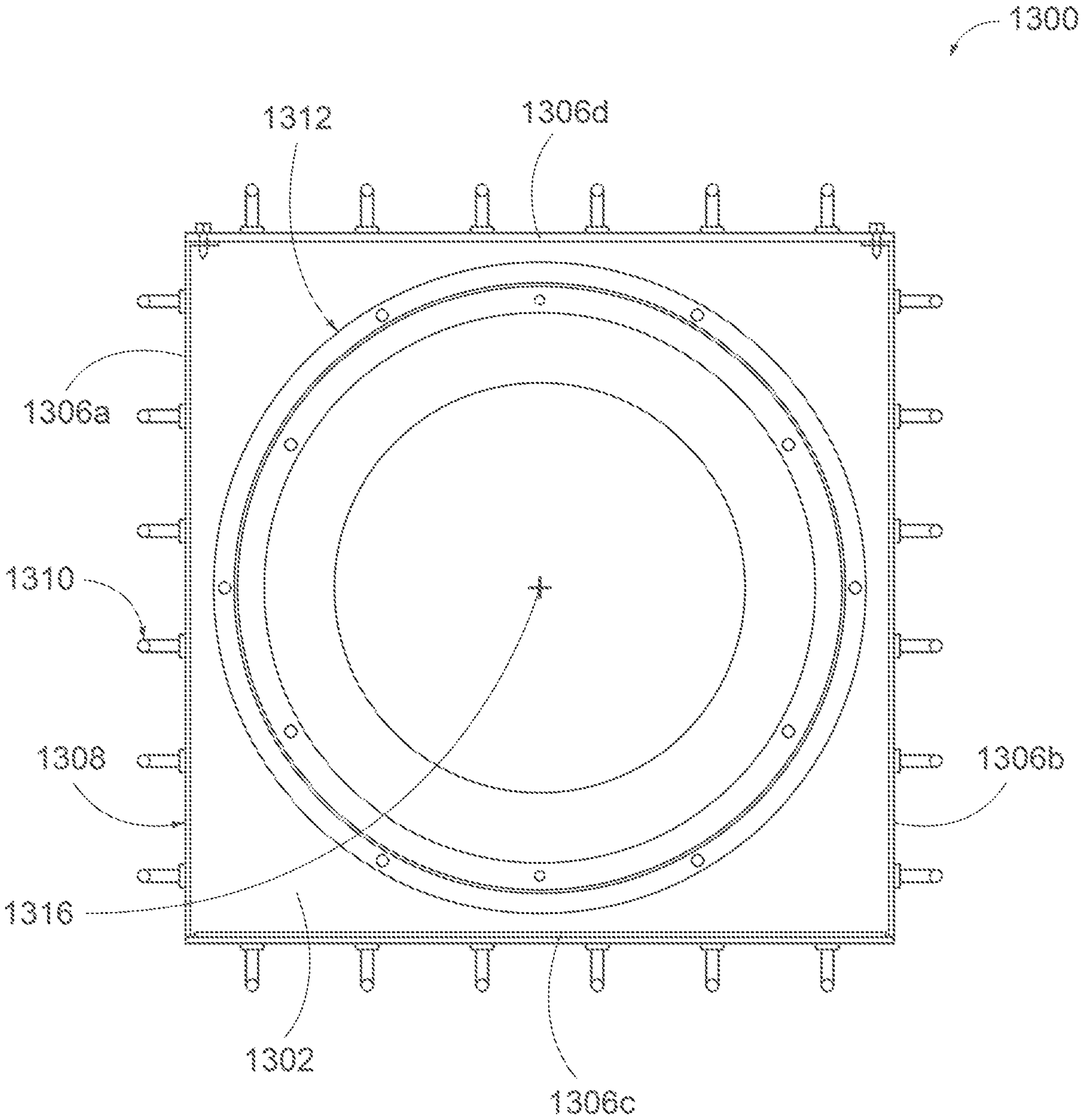
FIG. 13B shows a top view of a carousel keyboard, according to an aspect of this disclosure.

FIGS. 13A and 13B show a side view and top view of a carousel keyboard 1300, respectively, which may be placed inside the secured storage area of the vault to increase the amount of key storage compared to the key board 802 in FIG. 8. The carousel keyboard 1300 is defined by a top surface 1302, and a bottom surface 1304 opposite the top surface 1302. The carousel keyboard 1300 is further defined by first through fourth side surfaces 1306*a-d*. The first side surface 1306*a* is opposite the second side surface 1306*b*, and the third side surface 1306*c* is opposite the fourth side surface 1306*d*. Each side surface 1306*a-d* is substantially perpendicular to both side surfaces 1306*a-d* adjacent to it, for example, the first side surface 1306*a* is substantially perpendicular to both the third and fourth side surfaces

1306*c* and 1306*d*. Further, each side surface 1306*a-d* extends in the vertical direction V from the top surface 1302 to the bottom surface 1304, and each side surface 1306*a-d* is substantially perpendicular to both the top and bottom surfaces 1302 and 1304. Together, the top surface 1302, the bottom surface 1304, and the first through fourth side surfaces 1306*a-d* define a key box body 1308. The key box body 1308 is made of a material, for example, aluminum, an aluminum alloy, steel, a hard plastic, or any combination thereof. It should be appreciated that the key box 1308 may be made from materials not expressly listed but otherwise appropriate under the circumstances.

In an embodiment, the carousel keyboard 1300 comprises a plurality of key hooks 1310 coupled to at least one of the side surfaces 1306*a-d*. The number of hooks 1310 on a side surface 1306*a-d* may be any number, such as 20 through 40 hooks 1310, or any number appropriate under the circumstances based on factors such as the dimensions of the side surfaces 1306*a-d*, the number of keys expected to be held by the carousel keyboard at any given time, and the amount of space needed to be designated specifically for each key on the carousel keyboard 1300. The hooks 1310 may be coupled to the side surfaces 1306*a-d* by any means appropriate under the circumstances, for example, via screws, rivets, or adhesive. The hooks 1310 may be evenly spaced from one another on each side surface 1306*a-d*. Each side surface 1306*a-d* may include the same or different number of hooks 1310 as any other side surface 1306*a-d*.

In an embodiment, the carousel keyboard 1300 may further comprise a rotating mechanism 1312 coupled to the bottom surface 1304, wherein the rotating mechanism 1312 comprises at least one rotating ring 1314, for example, two rotating rings 1314. In an embodiment, the rotating mechanism 1312 is coupled between the bottom surface 1304 of the carousel keyboard 1300 and a base of a secured storage area (not pictured). The rotating mechanism 1312 may be configured to allow the carousel keyboard 1300 to rotate about a central axis 1316 that extends in the vertical direction V in a clockwise and/or counterclockwise direction.

In an embodiment, two or more carousel keyboards 1300 may be placed side-by-side from one another along the base of the secured storage area, wherein a rotating mechanism 1312 may be coupled between each of the two or more carousel keyboards 1300 and the base of the secured storage area. The two or more carousel keyboards 1300 may be spaced from one another to allow each of the two or more carousel keyboards 1300 to rotate 360 degrees about its central axis 1316 extending in the vertical direction V independently of one another in the clockwise and/or counterclockwise directions. For example, where a secured storage area comprises three carousel keyboards 1300, the second carousel keyboard 1300 may be rotated in either the clockwise or counterclockwise direction about its central axis 1316 without causing the rotation of either the first or third carousel keyboards 1300. It should be appreciated that the two or more carousel keyboards 1300 should be spaced sufficiently from the walls (not pictured) defining the secured storage area so as to allow each of the two or more carousel keyboards 1300 to rotate 360 degrees about its central axis 1316 in either the clockwise or counterclockwise direction without touching the wall.

Having thus described the various embodiments, it is to be appreciated and will be apparent to those skilled in the art that the present embodiments are to be considered in all respects as illustrative and not restrictive. Although features and elements are described above in particular combinations, it is to be appreciated that each feature or element can be used alone or in any combination or sub-combination with or without the other features and elements. Any single embodiment described herein can be supplemented with one or more elements from any one or more of the other embodiments described herein. Any single element of an embodiment can be replaced with one or more elements from any one or more of the other embodiments described herein.

What is claimed:

1. A podium comprising:

a secured storage area, the secured storage area being accessible through a door, a hinged end of the door being pivotally connected to a door frame by a at least one hinge, wherein the door has a main body, four door frame abutment bodies, and four door support bodies, the four door frame abutment bodies being orthogonally attached to a different portion of the main body and extending inward toward the secured storage area, the four door support bodies being orthogonally attached to a corresponding edge of a door frame abutment body of the four door frame abutment bodies and extending toward a center of the main body of the door; and the four door support bodies being substantially parallel to the main body, and wherein a first locking member and a second locking member are configured to be coupled together to secure the door in a closed position, and wherein the first locking member and the second locking member remain coupled to each other with the door in the closed position when at least 1,000 pounds of force is used to pull the door to an open position.

2. The podium of claim 1, further comprising a base;

a service side;

three exterior sides; and a desktop.

3. The podium of claim 2, further comprising a plate guard extending in a longitudinal direction from a first area on the door of the secured storage area to a second area on the service side when the door is in the closed position.

4. The podium of claim 1, further comprising an at least one sign, wherein the sign does not substantially compromise the security of the secured storage area, and wherein the at least one sign is an illuminatable sign.

5. The podium of claim 1, wherein the at least one hinge is spring loaded such that the door is biased towards a closed position when the door is in an open position.

6. The podium of claim 1, wherein a gap between at least one exterior surface of the four frame abutment bodies and a corresponding door abutment surface of the door frame is less than $3/16$ of an inch when the door is in a closed position.

7. The podium of claim 1, further comprising:

a utility drawer; and a security plate substantially separating the secured storage area and the lockable utility drawer.

8. The podium of claim 7, wherein removal of the utility drawer does not substantially compromise security of the secured storage area.

9. A podium comprising:

a secured storage area, the secured storage area being accessible through a door, a hinged end of the door being pivotally connected to a door frame by a at least one hinge, wherein the door has a main body, four door frame abutment bodies, and four door support bodies, each of the four door frame abutment bodies being attached to the main body, and each of the four door support bodies being attached to one or more door frame abutment bodies; and wherein a first locking member and a second locking member are configured to be coupled together to secure the door in a closed position, and wherein the first locking member and the second locking member remain coupled to each other with the door in the closed position when at least 1,000 pounds of force is used to pull the door to an open position.

10. The podium of claim 9, further comprising a plate guard extending in a longitudinal direction from a first area on the door of the secured storage area to a second area on a service side when the door is in the closed position.

11. The podium of claim 9, further comprising an at least one sign, wherein the sign does not substantially compromise the security of the secured storage area, and wherein the at least one sign is an illuminatable sign.

12. The podium of claim 9, wherein the at least one hinge is spring loaded such that the door is biased towards a closed position when the door is in an open position.

13. The podium of claim 9, wherein a gap between at least one exterior surface of the four frame abutment bodies and a corresponding door abutment surface of the door frame is less than 3⁄16 of an inch when the door is in a closed position.

14. The podium of claim 9, further comprising:

a utility drawer; and a security plate substantially separating the secured storage area and the lockable utility drawer.

15. A podium comprising:

a secured storage area, the secured storage area being accessible through a door, a hinged end of the door being pivotally connected to a door frame by a at least one hinge, wherein the door has a main body, four door frame abutment bodies, and four door support bodies; and wherein a first locking member and a second locking member are configured to be coupled together to secure the door in a closed position, and wherein the first locking member and the second locking member remain coupled to each other with the door in the closed position when up to about 1,000 pounds of force is used to pull the door to an open position.

16. The podium of claim 15, further comprising a plate guard extending in a longitudinal direction from a first area on the door of the secured storage area to a second area on a service side when the door is in the closed position.

17. The podium of claim 15, further comprising an at least one sign, wherein the sign does not substantially compromise the security of the secured storage area, and wherein the at least one sign is an illuminatable sign.

18. The podium of claim 15, wherein the at least one hinge is spring loaded such that the door is biased towards a closed position when the door is in an open position.

19. The podium of claim 15, wherein a gap between at least one exterior surface of the four frame abutment bodies and a corresponding door abutment surface of the door frame is less than 3⁄16 of an inch when the door is in a closed position.

20. The podium of claim 15, further comprising:

a utility drawer; and a security plate substantially separating the secured storage area and the lockable utility drawer.

* * * * *